US011599376B1

(12) United States Patent
Viswanathan et al.

(10) Patent No.: US 11,599,376 B1
(45) Date of Patent: Mar. 7, 2023

(54) DEEP LEARNING ARCHITECTURE FOR EDGE COMPUTING SYSTEM

(71) Applicant: Amazon Technologies, Inc., Seattle, WA (US)

(72) Inventors: Vivek Viswanathan, Chennai (IN); Senthil Natarajan, Chennai (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 397 days.

(21) Appl. No.: 16/796,519

(22) Filed: Feb. 20, 2020

(51) Int. Cl.
*G06F 9/455* (2018.01)
*G06N 3/08* (2023.01)
*G06F 9/38* (2018.01)

(52) U.S. Cl.
CPC ........ *G06F 9/45558* (2013.01); *G06F 9/3877* (2013.01); *G06N 3/08* (2013.01); *G06F 2009/4557* (2013.01); *G06F 2009/45595* (2013.01)

(58) Field of Classification Search
CPC ............... G06F 9/45558; G06F 9/3877; G06F 2009/4557; G06F 2009/45595; G06N 3/08
See application file for complete search history.

(56) References Cited

U.S. PATENT DOCUMENTS

| | | | |
|---|---|---|---|
| 2015/0278119 A1* | 10/2015 | Loh | G06F 21/575 713/193 |
| 2018/0233025 A1* | 8/2018 | Modestine | G08B 13/19636 |
| 2018/0322365 A1* | 11/2018 | Yehezkel Rohekar | G06V 10/774 |
| 2021/0149763 A1* | 5/2021 | Ranganathan | G06F 11/1064 |
| 2021/0150663 A1* | 5/2021 | Maiyuran | G06N 5/04 |
| 2021/0150770 A1* | 5/2021 | Appu | G06N 3/0445 |
| 2022/0122215 A1* | 4/2022 | Ray | G06F 12/1009 |

OTHER PUBLICATIONS

J. Chen and X. Ran, "Deep learning with edge computing: A review," Proc. IEEE, vol. 107, No. 8, pp. 1655-1674, Aug. 2019. (Year: 2019).*

Mohammed et al. 2018. Towards secure smarthome IoT: Manufacturerand user network access control framework. In Proceedings of the 2018 IEEE 32nd International Conference on Advanced Information Networking and Applications (AINA'18). IEEE, 892-899 (Year: 2018).*

* cited by examiner

*Primary Examiner* — Kenneth Tang
(74) *Attorney, Agent, or Firm* — K&L Gates LLP

(57) ABSTRACT

Devices and techniques are generally described for an edge computing system. In various examples, a first application executed by a first virtual machine may generate a configuration file specifying a first machine learning task and first data. The first virtual machine may send the configuration file to a second virtual machine. The second virtual machine may generate first data effective to cause the first machine learning task to be executed by a third virtual machine. In various examples, the second virtual machine may retrieve the first data. In at least some examples, the second virtual machine may send the first data and the second data to a third virtual machine configured with access to a graphical processing unit.

20 Claims, 11 Drawing Sheets

US 11,599,376 B1

DEEP LEARNING ARCHITECTURE FOR EDGE COMPUTING SYSTEM

BACKGROUND

Networked "smart" devices, sometimes referred to as "Internet-of-Things" or "IoT" devices, are able to communicate data with one or more other devices on a local network and/or with one or more back-end systems, such as web applications and/or services, over the internet. Such devices are increasingly commonplace in households, the workplace, and in industrial settings. For example, smart thermostats are able to remotely communicate with a web server that may, in turn, communicate temperature data to an end user. Typically, an end user of a smart thermostat may receive current thermostat data from the web service and may control the thermostat through a companion application executing on the user's mobile device and/or through a web application. Similarly, a web service associated with the thermostat may receive temperature data and/or control setting data from the thermostat and may track statistical data and/or perform other computations that may be useful to the end user. The end user may access such information from the back-end service through a web application and/or a companion mobile application. Additionally, the back-end service may send software updates to the smart thermostat and/or may send push notifications to the end user through a companion application. Examples of other smart devices include smart speakers, virtual assistants, smart refrigerators, smart lighting systems, security systems, locks, various sensors, etc. In various examples, smart devices, such as those described above, may communicate with remotely-located computing devices (e.g., devices providing back-end services) and/or with one another through a base station or hub. Additionally, in some examples, such hubs and/or base stations can enable different smart home devices to communicate with one another when the devices use communication protocols that are otherwise incompatible.

DETAILED DESCRIPTION

Figure 1A:
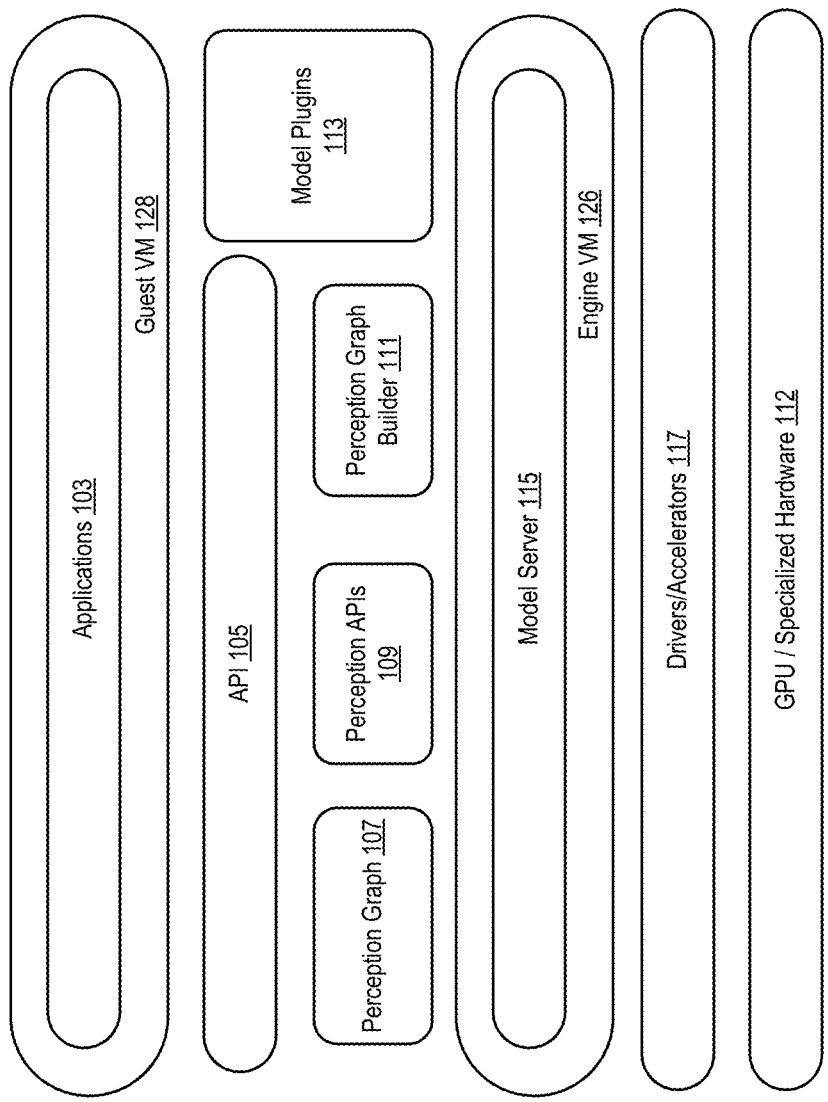
FIG. 1A is a conceptual block diagram of a deep learning architecture for an edge computing system, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

"Smart" devices, as used herein, may refer to various devices that include at least one processor, at least one memory, and communication hardware (e.g., a network card, an antenna, short-range wireless communication technologies, etc.). Smart devices may be effective to communicate with other devices using various communication protocols. In addition, in at least some examples, smart devices may communicate with one or more remote computing devices (e.g., "back-end" systems including servers and/or serverless computing systems) over the internet. In various examples, the back-end systems may offer computing services and/or may store data associated with the smart devices. Accordingly, as used herein, "back-end" systems refer to remote computing systems and/or services provided by such systems that are accessible by a smart device over a network. In at least some examples, the back-end systems may have access to increased computing resources relative to the hardware resources of the smart devices themselves.

In an example, a smart device may be a home security system comprising a camera including a microprocessor, memory, and communication hardware. The camera may capture image data and may transmit the image data over the internet (e.g., through a wired or wireless access point) to a back-end system associated with the camera. The back-end system may perform image and/or video processing that may be beyond the capabilities of the local hardware of the camera. For example, the back-end system may perform one or more computer vision techniques to identify persons and/or objects represented in the image data captured by the camera and may send push notifications to a mobile device associated with a user of the camera. However, in various examples, such back-end processing may introduce significant latency (e.g., due to network congestion) that may result in impractical results and/or user annoyance. Additionally, in various examples, transmission of sensitive user data over networks may cause privacy concerns among users. For example, transmitting image and/or video data captured at a user's home over the internet to a back-end server may cause user concerns related to access to the data, storage of the data, potential security risks related to the data, etc.

Accordingly, described herein is an edge computing system that may be used to perform various services associated with smart devices locally while providing enhanced security features. As used herein, "edge device" may refer to a computing device providing access to back-end systems (such as back-end enterprise servers) associated with various smart devices. The smart devices may be communicatively coupled to the edge device over a wired or wireless local area network (LAN/WLAN). Edge devices may provide computation capability and/or storage capability at a location that is physically proximate to where such computation and/or storage is needed. For example, a base station that communicates with a smart camera on a local area network (LAN) and provides one or more computer vision techniques for video data captured by the camera may be an example of an "edge" device. In various examples, edge devices may provide access to one or more back-end services associated with the edge device. The ability to perform various services locally as opposed to remotely by back-end services, may offer reduced latency. Additionally, the edge computing system described herein may offer increased computing capability relative to one or more hardware-constrained smart devices that communicate with the edge computing system. Accordingly, various computing operations may be "off-loaded" from the smart device to an edge computing system that is local to the smart device. "Local," as used herein, may refer to devices that may communicate with one another over a LAN and/or via direct peer-to-peer communication, as opposed to over a wide area network (such as the internet).

In various examples, software developers may develop applications that may use the various computing resources of such an edge device. For example, a software developer may develop an application that tracks the location of objects using computer vision techniques. The software developer may want to deploy such an application on an edge computing device. However, providing access to potentially sensitive user data (e.g., image data and/or video data) to the application may cause security concerns as the application code may not be secure and may be susceptible to attack. Additionally, the application may be configured with internet access. Accordingly, it may be difficult to ensure that the application does not send sensitive data over the Internet to unauthorized locations and/or users. Accordingly, in various examples described herein, architectures are described that control access to such sensitive data. In various examples, sensitive user data is controlled and/or maintained such that unauthorized applications are not provided with access to such data. Instead, such applications may request (e.g., through an application programming interface (API)) that one or more operations be performed on sensitive user data. The edge computing systems described herein may be effective to perform the requested action(s) without providing the requesting application direct access to the sensitive user data. Instead, result data may be returned to the applications in response to the user request. For example, if the application has requested that a user's keys be located (e.g., a computer-vision based object tracking application), the edge based computing system may perform the required computer-vision based tasks and may return result data identifying the location of the user's keys (e.g., bounding box data, coordinates, string data identifying the location, etc.) without providing the application any video and/or image data.

As described in further detail below, the various edge computing systems described herein may include specialized hardware resources configured to perform a variety of tasks. For example, the edge computing systems may comprise tensor processing programmable circuits, graphical processing circuits (e.g., GPUs), hardware accelerators, and/or hardware decoders effective to execute and/or perform deep learning and other machine learning tasks in a faster and more efficient manner relative to general purpose processors. As such, guest applications (e.g., applications developed by entities other than the manufacturer of the edge computing systems) may avail themselves of such resources to perform application-specific tasks. As described above, access to sensitive user data may be strictly controlled, by limiting application access to certain types of data. Accordingly, a high degree of functionality may be provided while alleviating common security concerns associated with traditional back-end systems.

As used herein, "system" refers to hardware and software components upon which other applications (e.g., third party smart device applications and/or other software) may be deployed and executed. As used herein, applications refer to software that may be executed to perform various services. A single application may comprise multiple operations and/or processes. In various examples, different components of the edge computing system described herein may perform different operations and/or processes of an application. For example, as described in further detail below, an application may be deployed by an edge computing system across multiple guest virtual machines, with each guest virtual machine deploying one or more processes and/or operations of the application.

In various examples, the edge computing systems described herein may be executed by a hub or base station computing device (e.g., host computing device 101 of FIG. 1B) that may be configured in communication with one or more smart devices. For example, the edge computing system may be an operating system executing at least in part on a base station computing device communicating on a LAN within a user's home.

Further, as described herein, the edge computing system may be designed in such a way as to emphasize security and privacy of data within the software stack of the edge computing system. For example, the edge computing system may control access to application-specific data and may provide security measures effective to prevent unauthorized access to data. Additionally, the edge computing system may control access to underlying host resources of the physical computing device(s) upon which the edge computing system executes. Further, the edge computing system may control and/or limit communication of data between different applications installed and/or executing on the edge computing system.

FIG. 1A is a conceptual block diagram of a deep learning architecture for an edge computing system, in accordance with various aspects of the present disclosure. As described in further detail below, applications (e.g., applications 103) executing on an edge computing system (e.g., edge computing system 100 of FIG. 1B) may be executed within one or more guest virtual machines (guest VMs) 128. Applications 103 may comprise functionality that uses specialized hardware and/or systems of the edge computing system. For example, an application 103 may be a computer vision application that performs facial recognition on image data captured by one or more cameras communicatively coupled to the edge computing system. In various examples, the facial recognition task may use one or more machine learning models (e.g., convolutional neural networks) in order to perform the facial recognition task. Accordingly, the application 103 may communicate with a model server 115 executing within an "engine" virtual machine 126 of the edge computing system 100. Engine virtual machines 126 are described in further detail below in reference to FIG. 1B. The engine virtual machine 126 executing the model server 115 may be executed locally on the host computing device 101 executing edge computing system 100. Accordingly, computer vision operations and/or machine learning processes may be executed locally by the model server 115 without having to send potentially sensitive data over the internet to a back-end system.

In the example, the model server 115 may execute the machine learning models used by the facial recognition task of the application 103. In order to execute the models and perform the facial recognition task, the model server 115 may be configured with hardware access privileges in order to access specialized hardware of the edge computing system. For example, the model server 115 may use drivers/accelerators 117 to access a graphics processing unit (GPU) 112 and/or other specialized hardware. Accordingly, access to the underlying hardware used to perform the facial recognition task may be controlled by the model server 115. In various examples, the application 103 may be unable to directly access the underlying hardware. For example, the application 103 may be executing within a specialized virtual machine that does not provide PCIe pass through for direct hardware access.

Applications 103 may access model server 115 using API 105. For example, an application 103 may generate a configuration file specifying data-sources, machine learning models, and/or sequence of model execution. The configuration file may be formatted and/or constructed in accordance with a software development kit (SDK) provided for using interfacing with the model server 115 and, more generally, with the deep learning architecture of the edge computing system 100. The configuration file may specify one or more actions to be taken by the model server 115. Examples may include data transformation, data augmentation, media processing, model inference, etc. The configuration file, in turn, may be sent to the model server 115 using the perception APIs 109. The perception graph builder 111 may parse the configuration file to generate a perception graph 107. A perception graph specifies and chains together modular components and/or operations—like data transformation, data augmentation, media processing, model inference, etc., into a workflow (e.g., a specific series of operations for execution by some combination of components, as described in further detail below. Video, audio, and/or other sensory streams enter the perception graph, and may be processed in accordance with the operations described in the perception graph by the components specified by the perception graph. Output of the various operations specified within the perception graph (such as object detection, keypoints estimate, facial recognition, and/or other detected items, etc.) are output by the perception graph. These modular components/operations may be predefined and made available as part of an SDK. In some other examples, the modular components/operations may be developed by application developers and may be specified in application configuration files in order to be incorporated within a perception graph along with the pre-defined components/operations. The perception graph 107 may be a data structure that comprises one or more nodes representing actions to be taken by the model server 115. The nodes may represent model server plugins that are effective to cause the model server 115 to perform one or more actions. For example, a configuration file generated by application 103 may specify that image data from a particular camera be decoded and that a CNN be executed using the image data as input to identify faces represented within the image data. The perception graph builder 111 may parse the configuration file and may generate a perception graph 107. The perception graph 107 may comprise a first node associated with a decode plugin of the model server 115. The decode plugin may cause the model server to decode video from the specified camera. The perception graph 107 may also include a node associated with a plugin that causes a CNN with parameters specified in the configuration file to be executed and to input the decoded image data into the CNN. Model server 115 executes the specified models, supports concurrent execution of multiple models (where relevant and possible), schedules model execution, prioritizes model execution, gathers metrics related to model execution, and provides model output (e.g., output data) back to the calling application 103. The perception graph 107 may represent abstractions describing a multimedia pipeline to be used to pre-process a video stream into the appropriate form for input into downstream machine learning models executed by model server 115. A guest application executing on one or more guest virtual machines 128 (e.g., application 103) may use configuration file 450 to specify how the multimedia pipeline should function for that application (and/or its data). The perception graph builder support routines 414 (and more specifically configuration file parser 416) may parse all such configurations, and may generate a multimedia pipeline (for processing the application's data) that satisfies the union of all computer vision applications and/or other machine learning applications that are to be simultaneously executed.

As discussed in further detail below, the perception graph 107 may be implemented within a container and/or other specialized virtual computing environment. In various examples, the container and/or other specialized virtual computing environment may have limited hardware emulation and may not include a virtual network adapter and/or other means for accessing the internet. Accordingly, data of the container/VM may not be accessible over the internet, providing enhanced data security. Data such as video, audio, telemetry data (and/or other sensory data) may be sent to the perception graph 107 and may, in turn, be sent to model server 115 for processing in accordance with the plugins represented as nodes within perception graph 107. For security and privacy reasons, the relevant sensitive data (e.g., video, audio, sensory data) is not accessible by the application. Instead, the sensitive data is sent to the perception graph 107 on the secure container/VM and is communicated, as needed, to the model server 115 for processing, in accordance with the configuration file supplied by the application. Results of processing by the model server 115 may be sent to a companion application associated with the edge computing system 100 and/or may be stored locally by the edge computing system 100.

In various examples, some applications 103 may have access privileges allowing such privileged applications to directly communicate with model server 115. Such privileged applications may communicate with model server 115 using model plugins 113. Model plugins 113 may allow the privileged application to directly access services by the model server without requiring that the applications send a configuration file through API 105 and generate a perception graph 107 in order to access services of model server 115.

Figure 1B:
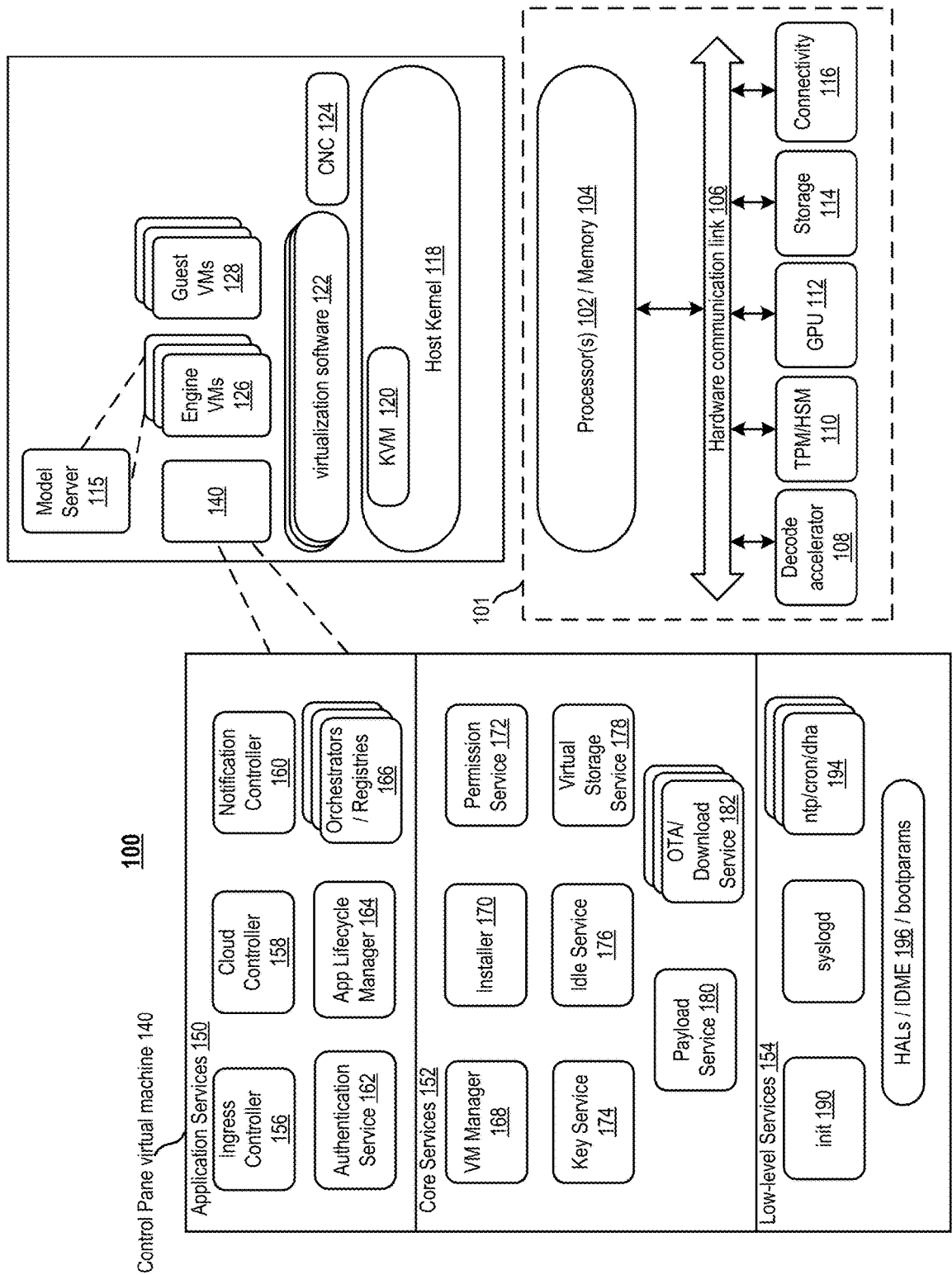
FIG. 1B is a block diagram depicting an example edge computing system, according to various embodiments of the present disclosure.

FIG. 1B is a block diagram depicting an example edge computing system 100 and a host computing device 101 executing edge computing system 100, according to various embodiments of the present disclosure. Various components of FIG. 1B may be omitted in various implementations of the edge computing systems described herein. Further, additional components apart from what is depicted in FIG. 1B may be added, depending on the desired implementation.

Edge computing system 100 may be executed by one or more physical machines (e.g., one or more computing devices). For example, edge computing system 100 may be executed by host computing device 101. The host computing device(s) may comprise one or more processors 102 (e.g., one or more single-core and/or multi-core processors). The one or more processors 102 may be configured in communication with memory 104 (e.g., random access memory). In various examples, memory 104 may be effective to store various instructions selected from a native instruction set of the edge computing system. The instructions may be used to program the one or more processors 102 to perform various processes and/or to instantiate the various components of the edge computing system 100 described in further detail below. Further, the one or more processors 102 may be effective to retrieve data stored in a storage 114.

The one or more processors 102 may comprise any suitable processors. For example, the one or more processors 102 may comprise one or more digital signal processors (DSPs), general purpose processor cores, and/or graphical processing units. Similarly, storage 114 and memory 104 may include one or more different types of memory, data storage, or computer-readable storage media devoted to different purposes within the edge computing system 100.

The one or more processors 102 may communicate with various other hardware components of the host computing device 101 via communication link 106. Communication link 106 may include one or more communication links (e.g., one or more buses) that may transmit data between various hardware components of the host computing device 101 executing edge computing system 100. Data may be sent serially or in parallel depending on the particular implementation. Additionally, the communication link 106 may be classified into a certain number of bits (e.g., 16-bit, 32-bit, 64-bit, etc.) that describes the number of bits that the communication link 106 is able to transmit in parallel. The bit classification of a particular communication link 106 may depend on the design of the particular bus (and/or on the design of one or more of the processors 102 communicatively coupled to the bus). In various examples, the communication link 106 may be used to transfer data, may include address lines for accessing particular memory addresses (e.g., in storage 114), may supply power to various hardware components, and/or may provide a system clock that may be used to synchronize various signal and components communicating via the communication link 106.

In various examples, the host computing device 101 may comprise various hardware components that may be communicatively coupled to the one or more processors 102 and/or the memory 104 via the communication link 106. For example, the host computing device 101 may include an accelerator 108, a TPM, and/or an HSM (referred to herein as TPM/HSM 110 or HSM 110), an artificial intelligence (AI) accelerator application specific integrated circuit (ASIC) used for machine learning, a GPU 112, storage 114, and/or connectivity component 116.

Accelerator 108 may be a hardware acceleration component (e.g., a hardware accelerator circuit) effective to perform one or more operations that may improve the speed and/or performance of functionality of the computing system relative to executing the same operations in software on a general purpose processor. In various examples, the accelerator 108 may comprise one or more ASICs, programmable circuits (e.g., field-programmable gate arrays (FPGAs)), and the like. The accelerator 108 may perform operations effective to increase the processing speed, reduce power consumption, lower latency, increase parallelism, improve utilization of various other components, etc. In general, accelerator 108 may include circuits that may be used to perform any processing task that may be performed by a general purpose processor. However, the use of a dedicated accelerator 108 may improve performance of that processing task by off-loading the processing task from the general purpose processor to the special purpose hardware of the accelerator 108. Since the accelerator 108 is designed and/or programmed to perform one or more specific tasks, use of accelerator 108 may achieve performance efficiencies relative to the use of the general purpose processor (e.g., one or more processors 102) for the same task.

Various examples of accelerators 108 may include a network processor, and/or network interface controller (e.g., an NPU and/or NIC), a digital signal processor (DSP), an analog signal processor, a cryptographic accelerator to perform hardware-based encryption, a codec accelerator, a physics processing unit, an image/video decoder circuit, an image/video encoder circuit, a data compression accelerator, etc. In various examples, a TPM, an HSM 110, an AI accelerator, and/or GPU 112 may be dedicated hardware accelerators that may be described as part of accelerators 108. However, the TPM, HSM 110, AI accelerator, and/or GPU 112 may be described as separate components herein for conceptual clarity due to various implementations of host computing device 101 making use of such components. However, in various examples, a TPM, an HSM 110, an AI accelerator, and/or a GPU 112 may be considered as a subset of accelerator 108 and/or as a subset of hardware acceleration components.

HSM 110 may be a hardware component of host computing device 101 that may store cryptographic keys used for encryption of data. In various examples, TPMs and/or HSMs may be used to protect data in storage 114 by making the data inaccessible until a system verification and/or authentication process is completed. TPMs may be hardware-based components which include a key that may be used for asymmetric encryption. TPMs can generate, store, and protect other keys used during encryption/decryption processes. An HSM is a security component that may be added to encrypted computing systems to manage, generate, and securely store cryptographic keys. HSMs may be instantiated as a dedicated hardware component (e.g., as a removable hardware component such as a PCI card) and/or may be an external device accessible via a network using transmission control protocol/internet protocol (TCP/IP). By contrast, TPM may be a dedicated chip or chipset. While HSMs may be added to and removed from a system or network, TPMs are typically installed during manufacturing of a motherboard and are thus integrated into the device. In some embodiments, both TPMs and HSMs may use the Rivest-Shamir-Adleman (RSA) algorithm to generate an RSA key. An RSA key uses a public key/private key pair to encrypt and decrypt data. In the case of TPMs, the RSA key may be directly encoded during the manufacture of the chip (e.g., "burned" into the chip). In HSMs, the HSM is the hardware root of trust (RoT) within the cryptographic system where RSA keys are securely stored. One skilled in the art will appreciate that other cryptographic techniques such as elliptic curve encryption may also be used depending on the application.

The RSA key (e.g., the private key) of the TPM/HSM 110 is inaccessible outside of the host computing device 101, thereby enabling the edge computing system 100 to authenticate the cryptographic information received from external sources (e.g., from smart devices communicating with the host computing device 101 on the LAN). The RSA key may be inaccessible due to its storage in separate memory that may only be accessed by privileged hardware instructions. In the case of the TPM, the key may be directly encoded during the manufacture of the chip, as described above. In HSMs, the private key may be stored in physically separate memory that may only be accessed via privileged hardware instructions.

AI accelerator and/or graphical processing unit (GPU) 112 may be dedicated hardware accelerators used for specialized processing tasks. Generally, GPUs are electronic circuits designed to manipulate and alter memory to accelerate the creation of image data in a frame buffer. The GPU may be embedded on the motherboard and/or may be present on a video card (e.g., a PCI card). GPUs may be used to perform parallel calculations related to three-dimensional (3D) graphics. Additionally, GPUs may be used to accelerate memory-intensive graphical processing operations such as texture mapping, polygon rendering, geometric calculations (e.g., rotation, translation, sheer, etc. of vertices of 3D representations into different coordinate systems). Other capabilities of GPUs may include texture manipulation, interpolation, anti-aliasing, high precision color mapping, discrete cosine transforms (DCT) and other frequency-based transforms, computer vision, motion compensation, intra-frame prediction, quantization, inter-encoding, etc.

In various examples, an AI accelerator circuit may be configured in communication with other hardware components via communication link 106. The AI accelerator circuit may be effective to perform operations on tensors (e.g., matrix multiplication), as described below. In various examples, the AI accelerator circuit may comprise ASICs and/or programmable circuits configured to perform a large volume of low precision computation, as compared to GPUs. In other embodiments, other tensor-processing circuits may be used in accordance with the host computing device 101. Tensor processing may be used to accelerate neural network and/or other machine learning computations. Additionally, implementing tensor processing in an ASIC may enable the decreased consumption of energy relative to a functionally equivalent programmable circuit (e.g., a GPU). Generally, dedicated tensor processing circuits are designed to perform matrix multiplication, summation, and activation function processing. Matrix multiplication is often computationally-intensive. Accordingly, a dedicated tensor processing unit may enable the edge computing system 100 executing on host computing device 101 to perform various machine learning tasks locally instead of sending such tasks to a remote cloud-based server. Local execution may reduce latency and thus provide an improved user experience and improved local-processing capability.

Storage 114 may comprise one or more disk drives of non-volatile storage. Storage 114 may comprise a disk drive, solid state drive, flash memory, and/or any other type of non-volatile storage medium. The one or more processors 102 may communicate with storage 114 via communication link 106. For example, the one or more processors 102 may load data from storage 114 into memory 104.

Connectivity component 116 may comprise a network interface card (NIC) effective to connect to the computing device to a network. Generally, connectivity component 116 may implement the physical layer and the data link layer of the Open Systems Interconnection model (OSI model). The physical layer refers to the electrical and physical aspects of devices, specifying how a device sends and receives information (e.g., via copper wires, fiber-optic cables, etc.). The data link layer may divide information sent by the network into frames for transmission over the physical layer. In various examples, the data link layer may also perform various aspects of error correction and/or addressing to enable distinguishing from different devices in a network. The connectivity component 116 may allow the computing device to access the LAN provided by a router. The router, in turn, may be connected to a modem providing access to the internet. Accordingly, the connectivity component 116 may provide for communication with other devices on the LAN as well as with remote computing devices accessible via the internet. The router may act as the access point for internet communication. As used herein LAN may refer to both wired and wireless local area networks. Additionally, connectivity component 116 of host computing device 101 may comprise both wireless and wired communication technologies. For example, connectivity component 116 may include wireless NICs effective to wirelessly communicate data with one or more other devices via a WLAN using the IEEE 802.11 standard.

The various hardware components (e.g., one or more processors 102, memory 104, communication link 106, decode accelerator 108, TPM/HSM 110, TPU/GPU 112, storage 114, connectivity component 116, etc.) may be part of a host computing device 101 that, in turn, may be a part of host computing device 101. Although referred to as a computing device, host computing device 101 may comprise multiple different computing devices that may be included in one or more physical hardware groupings or "boxes."

In various examples, memory 104 may be physically dispersed between various chip sets and/or hardware components of host computing device 101. For example, a first portion of memory 104 may be deployed on a motherboard along with the one or more processors 102. Additionally, in some examples, one or more on-board GPUs may be deployed on the motherboard. In addition, a second portion of memory 104 may be deployed on-board with respect to other hardware components, such as TPU/GPU 112. Additionally, in some examples, connectivity component 116 may comprise a platform controller hub (PCH) and/or a peripheral component interconnect (PCI) bus.

Upon booting, host computing device 101 executes its operating system. Any desired operating system may be used in accordance with the various embodiments described herein. In various examples, in a virtualized environment such as that described herein, host computing device 101 may be referred to as the "host" device, which "hosts" one or more virtualized computing environments, as described in further detail below.

The host operating system may comprise a host kernel 118. The host kernel 118 is a computer program that controls the host operating system and access to system resources. The host kernel 118 is typically loaded after the bootloader during start-up of the host computing device 101. The host kernel 118 performs start-up operations, handles input-output requests from software, and translates the input/output requests into instructions executable by the one or more processors 102. Additionally, the host kernel 118 controls memory 104, storage 114, and peripheral devices. The code of the host kernel 118 is typically loaded into a protected kernel space in memory 104 that is protected from access by application programs and/or from other non-critical components of the host operating system. The host kernel 118 controls access to the one or more processors 102 (e.g., thread scheduling, etc.), manages hardware devices (such as memory 104, communication link 106, decode accelerator 108, TPM/HSM 110, TPU/GPU 112, storage 114, connectivity component 116, etc.), and handles interrupts in the protected kernel space within memory 104.

The host kernel 118 may have access to the memory 104 and may control access by various processes executing on the one or more processors 102 to memory 104. In various examples, the host kernel 118 controls access to memory 104 using virtual addressing. Virtual addressing refers to making a physical memory address appear to be another address called the "virtual address." Virtual address spaces allow different programs to access memory 104 as if no other programs apart from that program were currently executing, preventing applications from crashing one another.

On many systems, a program's virtual address may refer to data which is not currently in memory. The layer of indirection provided by virtual addressing may enable the host operating system to use other non-volatile data stores, such as storage 114, to store what would otherwise be stored in a volatile memory 104 (e.g., RAM). As a result, the host operating system can allow programs to use more memory 104 than the system has physically available. When a program needs data which is not currently in memory 104, the processor(s) 102 signals to the host kernel 118 that a request for such missing data has been received, and the host kernel 118 may respond by writing the contents of an inactive memory block of memory 104 to storage 114 (if necessary) and replacing the inactive memory block with the data requested by the program. The program can then be resumed from the point where it was interrupted.

Virtual addressing may also enable creation of virtual partitions of memory in two disjointed areas, one being reserved for the host kernel 118 (e.g., the "kernel space") and the other for the applications (e.g., the "user space"). The applications are not permitted by the processor(s) 102 to address the kernel space memory, thus preventing an application from damaging the running kernel.

Additionally, the host kernel 118 provides access to peripherals and other hardware through device drivers. A device driver is a computer program that enables the operating system to interact with a hardware device. It provides the operating system with information on how to control and communicate with a certain hardware component. The driver translates operating system-mandated function calls (sometimes referred to as "programming calls") into device-specific calls effective to control the hardware.

A process may execute a system call to request a service from the operating system's host kernel 118 that the process normally does not have permission to run. System calls provide the interface between a process (e.g., an application) and the host kernel 118. Most operations interacting with the system require permissions not available to a user level process. For example, input/output for a hardware component present on the system and/or communication with other executing processes requires the use of system calls.

A system call is a mechanism that is used by the application program to request a service from the operating system. System calls employ a machine-code instruction that causes the processor(s) 102 to change modes. An example would be from supervisor mode to protected mode where the operating system performs actions like accessing hardware devices or a memory management unit. Generally the operating system provides a library for interfacing between the operating system and normal programs (e.g., a C library such as GNU C (glibc package) or Windows API). The library handles the low-level details of passing information to the host kernel 118 and switching to supervisor mode. System calls include close, open, read, wait and write. During execution, a process accesses various services provided by the host kernel 118. The library is used to invoke the various host kernel 118 functions.

The method of invoking the kernel function varies from kernel to kernel. If memory isolation is in use, a user process a process executing in the user space) is not permitted to call the kernel directly, because that would be a violation of the processor's access control rules. However, the user process may use a software-simulated interrupt. An interrupt is a signal to the processor(s) 102 indicating an event that requires immediate attention. An interrupt alerts the processor to a high-priority condition requiring interruption of the current code being executed by the processor(s) 102. Software-simulated interrupts are available on most hardware.

Another system call option available on some host kernels 118 is a call gate. The call gate is a special address stored by the host kernel 118 in a list in kernel memory at a location known to the processor(s) 102. When the processor(s) 102 detect a call to that address, it instead redirects to the target location without causing an access violation. This requires hardware support, and so may be unavailable in some implementations. In another example, a system call instruction may be used to access the host kernel 118. System call instructions typically require hardware support and thus may be unavailable in some implementations.

In various examples, a virtualization module may be executed on the host kernel 118 to allow the host kernel 118 to function as a hypervisor. A hypervisor may be software, hardware, and/or some combination of hardware and software that may generate and execute virtual machines (e.g., a guest computing environment hosted by one or more physical machines). Typically, hypervisors are divided into "Type 1" hypervisors or "bare-metal" hypervisors and "Type 2" or "hosted" hypervisors. Type 1 hypervisors run directly on the host device's hardware while Type 2 hypervisors run as a program on an operating system of the host.

In general, the embodiments described herein describe an implementation using a Type 2 hypervisor (and more particularly using the Kernel-based Virtual Machine (KVM) in the Linux kernel). However, it should be appreciated that a Type 1 hypervisor may instead be used in accordance with the desired implementation of the edge computing system 100.

Generally, control plane virtual machine 140 implements a portion of the operating system of edge computing system 100 that controls generation of new virtual machines (e.g., creation of new guest virtual machines 128) and start/stop of existing virtual machines (e.g., guest virtual machines 128, engine virtual machines 126, and/or primitives). Once a guest virtual machine 128 is started and is running, control plane virtual machine 140 is not involved with the flow of data between the guest virtual machine 128 and the corresponding device (e.g., a smart device on the LAN) or back-end service. Instead, the code, applications, and/or devices executed by the guest virtual machines 128 may implement network communication with back-end services and perform guest-specific processing according to their specific configurations.

Figure 2:
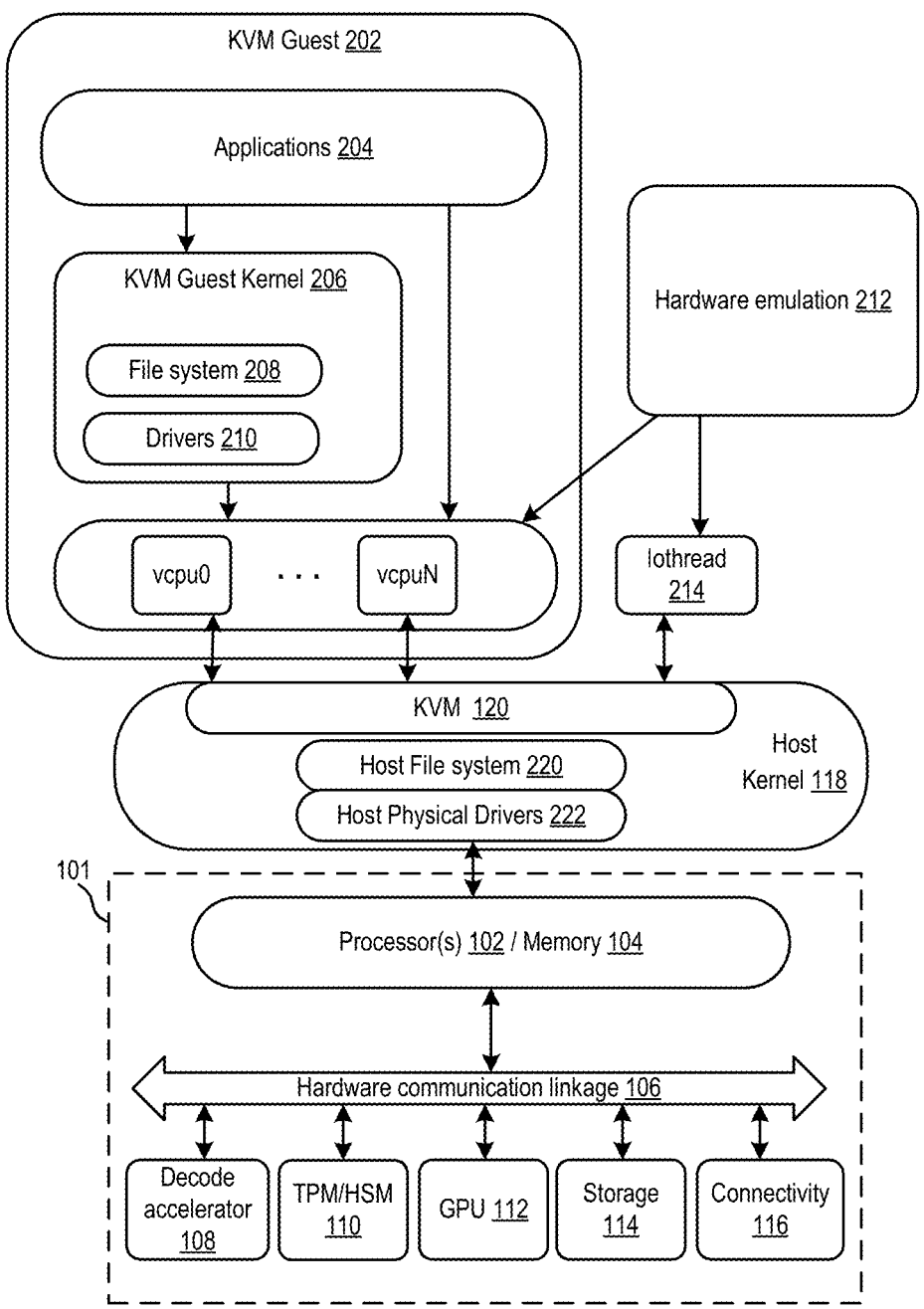
FIG. 2 depicts a block diagram of an example kernel-based virtual machine component (KVM), in accordance with various aspects of the present disclosure.

In FIG. 1B, KVM 120 is executed by host kernel 118. A kernel-based virtualized environment is depicted and described in reference to FIG. 2. KVM is a virtualization module of the Linux kernel. KVM uses hardware support in the form of a processor with hardware virtualization extensions such as Intel VT or AMD-V. KVM 120 is loaded into memory 104 and utilizes the processor(s) 102 and a user-mode driver QEMU (and/or other hardware emulation system) for hardware emulation 212 to emulate a hardware layer upon which virtual machines can be created and executed.

KVM guest 202 is an example of a guest virtual machine that is generated by KVM 120. In various examples, one or more of guest virtual machines 128 of FIG. 1B may be KVM guests 202. In general, different virtualization software 122 may be executed by host kernel 118. Accordingly, guest virtual machines may be launched using a variety of different virtualization software depending on the particular hardware emulation requirements of a given guest virtual machine. Generally, guest virtual machines may run unmodified operating systems and may include private virtualized hardware (e.g., a network card, memory, disk, GPU, etc.). The KVM guest 202 may run one or more applications 204. The applications 204 may access the KVM guest kernel 206 (including a file system 208 and/or virtualized drivers 210 to access the emulated hardware of the KVM guest 202). In the example depicted in FIG. 2, the KVM guest has virtual processors vcpu0 . . . vcpuN. The processors and other virtualized hardware are emulated by hardware emulation 212 (e.g., QEMU).

IO thread 214 is a thread generated by hardware emulation 212 that is directed to KVM 120 executing on the host kernel 118. Additionally, IO thread 214 handles events received from the host system (e.g., host computing device 101).

KVM 120 may allocate RAM and load the code received from virtual processors of KVM guest 202 (and/or from IO thread 214). KVM guest 202 may be an example instantiation of a virtual machine using the KVM hypervisor and QEMU hardware emulation. In various examples, some of guest virtual machines 128 and/or engine virtual machines 126 of FIG. 1B may be examples of KVM guests 202, although guest virtual machines 128 and/or engine virtual machines 126 may be launched on KVM 120 using different virtualization software 122 (as described below) according to the particular hardware emulation requirements of a given virtual machine. Accordingly, while KVM guest 202 is described with particular characteristics for illustrative purposes in FIG. 2, a particular guest virtual machine 128 may not include all of the various hardware emulation described in reference to KVM guest 202.

Instead of recompiling guest code, KVM 120 may generate a thread. The thread calls the KVM 120 which then causes the host kernel 118 to switch to guest mode and to execute the KVM guest 202's code. The host kernel 118 includes a host file system 220 and host physical device drivers 222. Host physical device drivers 222 are used to access the underlying hardware of the physical host device (e.g., host computing device 101).

Guest virtual machines are isolated from one another allowing multiple guests to run securely while sharing the same physical hardware. Guest virtual machines may be isolated as the resources of the host machine (e.g., the host file system 220, host physical device drivers 222, etc.) are controlled and limited by KVM 120. In the user space of KVM guest 202, only the virtualized file system 208, virtualized drivers 210, and other resources made available by hardware emulation 212 are detectable by the guest operating system. Additionally, KVM 120 controls and limits access to the underlying host hardware (e.g., processor(s) 102, memory 104, storage 114, etc.). Accordingly, the KVM guest 202 is "sandboxed" and isolated from other guest virtual machines (e.g., any other virtual machines executing on the host computing device 101) and from the underlying physical host device. Additionally, the different points where an unauthorized user can try to enter data or extract data from the system (e.g., the "attack surface") may be minimized as a malicious attacker is unable to detect the underlying host device apart from the interfaces between the guest virtual machine and the host system.

However, for at least some applications and/or operations, virtual machines that include full, unmodified copies of operating systems may be slow to load and/or may consume a large amount of computing resources to operate. Accordingly, various other virtualization technologies have evolved to increase the speed and flexibility of virtualization. One example of such a technology is a containerization. A container is a virtual runtime environment that runs on a single operating system kernel and emulates an operating system rather than the underlying hardware. Compared with virtual machines, containers increase performance (e.g., throughput) and reduce latency as containers do not emulate underlying hardware and do not include full copies of operating systems. Containers enable faster startup relative to virtual machines, and have lower compute-resource overhead, thereby enabling higher density deployment on the host system. However, containers lack hardware virtualization technologies (e.g., VT-x and VT-d) and thus have relaxed isolation controls and are often considered less secure relative to virtual machines.

Various virtualization technologies attempt to address the security concerns surrounding containers while providing the speed, scalability, and low compute overhead benefits offered by containerization. One such approach are the Firecracker virtual machines provided by Amazon Technologies, Inc., of Seattle, Wash. Virtualization software 122 comprises virtualization technology (e.g., a software virtual machine monitor) that leverages KVM 120, and other virtualization features to run lightweight virtual machines at near-native speeds. Firecracker virtual machines are often referred to as "lightweight" virtual machines or "microVMs" as the Firecracker virtual machines provide an alternative to QEMU-based device emulation. Firecracker virtual machines provide minimal device emulation to the guest operating system and omit non-essential functionality (e.g., VGA, BIOS, etc.) to achieve faster startup and reduced memory requirements relative to traditional virtual machines. For example, Firecracker virtual machines may be launched in less than 120 ms.

Figure 3:
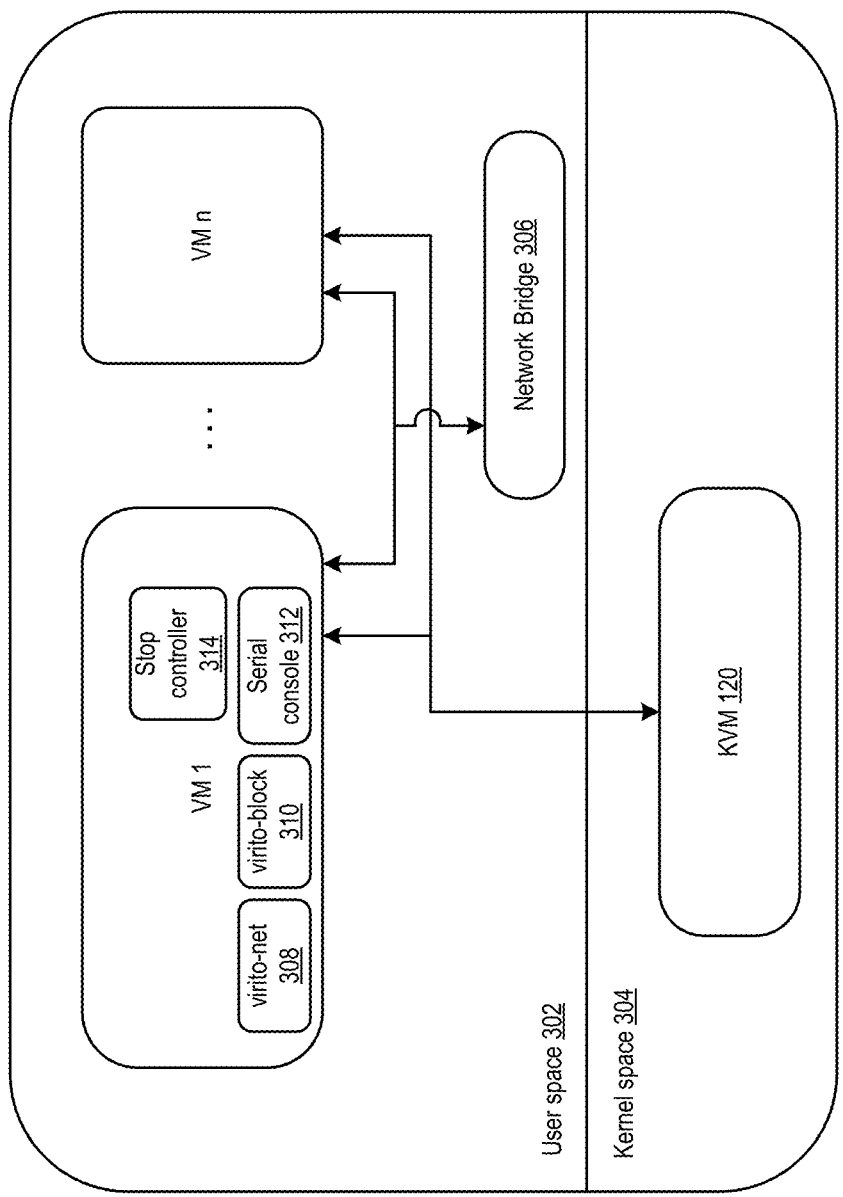
FIG. 3 depicts a virtualized environment, in accordance with various aspects of the present disclosure.

Firecracker virtualization software 122 executes in the user space and communicates with KVM 120 to enable container-based multi-tenancy using KVM 120 on Linux-based kernels (e.g., host kernel 118). FIG. 3 depicts a virtualized environment that may be employed by various implementations of the edge computing system 100 described herein. In various examples, FIG. 3 may execute Firecracker virtual machines, as described in further detail below.

In the various examples below, Firecracker virtual machines are described. However, it should be appreciated that other virtualization technologies may be used in accordance with the various embodiments described herein. However, virtual machines and other virtualized computing environments that do not store complete copies of operating systems (and may therefore be described as "lightweight") may be advantageous in the various embodiments described herein due to the relative speed at which such "lightweight" virtual machines may be deployed and due to the scalability and lower compute requirements of such technologies. One skilled in the art will realize that the techniques described herein are not tied to the use of Firecracker virtual machines and any other virtualization technology that has similar or additional features compared to Firecracker can be used to implement aspects of the techniques described herein.

In order to start a Firecracker virtual machine, Firecracker binary (e.g., virtualization software 122 of FIG. 1B) may be executed. A RESTful application programming interface (API) may be exposed by the Firecracker virtualization software 122. An InstanceStart command may be used in the Firecracker API to deploy Firecracker virtual machines. Firecracker virtualization software 122 executes in user space 302 and uses KVM 120 to generate virtual machines. The RESTful API enables configuration of the number of virtual CPUs included in a guest virtual machine. Additionally, rate limiters may be configured via the RESTful API to support bandwidth thresholds for each guest Firecracker virtual machine.

As previously described, Firecracker virtual machines provide a reduced device model to the guest operating system while excluding non-essential functionality. For example, instead of providing hardware emulation of an entire system using QEMU, Firecracker virtual machines may include only a few emulated devices: a paravirtualized networking device, a paravirtualized storage device (e.g., a block I/O device), a serial console, a KVM clock, and a partial keyboard that may only include a single button used to reset the virtual machine. Notably, Firecracker virtual machines may lack any emulated BIOS (which may further minimize the attack surface of the Firecracker virtual machine). For example, as shown in FIG. 3, VM1 may include virtio-net 308, virtio-block 310, serial console 312, and a stop controller 314 (e.g., a one button keyboard controller) used to stop the guest virtual machine. Virtio-net 308 is a paravirtualized network device driver that provides network access to the guest virtual machine. In various examples, paravirtualized devices may allow for direct communication with the hypervisor (KVM 120) to access host hardware components using paravirtualized drivers. By contrast, in full virtualization, hardware components are emulated and calls to the emulated hardware components are translated by the guest operating system (e.g., using binary translation) into calls to the underlying host hardware components. Paravirtualization may achieve performance efficiencies relative to full virtualization. Virtio-block 310 is used for block storage (e.g., access to storage 114). Serial console 312 is used for input/output access to the guest virtual machine. Stop controller 314 is used to stop the guest virtual machine. Limiting the Firecracker virtual machines to the four devices described above provide the "lightweight" or "micro" nature of the Firecracker virtual machines, enabling faster deployment and reduced computing overhead relative to traditional virtual machines. Paravirtualized devices include device drivers that communicate directly with the hypervisor (KVM 120) using hypercalls to request the desired hardware manipulations.

"Serverless" computing environments often run small amounts of code used to implement short-lived processes. Examples may include AWS Lambdas. Virtual machines may be launched to run such code (e.g., Lamdas) on demand, in response to some triggering event, for example. However, booting a traditional virtual machine may be slow, often leading to start-up latency in a "serverless" computing paradigm. Accordingly, the lightweight virtual machines (e.g., the Firecracker virtual machines) described above may be advantageous as such virtual machines implement a minimal device model to launch Linux guest virtual machines more quickly allowing for on-demand computing in response to external trigger events.

In FIG. 3, serial console 312 communicates with KVM 120 executing in the kernel space 304 of host kernel 118. KVM 120 may control access to underlying host resources (e.g., memory 104, host processor(s) 102, storage 114, etc.) and the allocation of the host resources to guest virtual machines (e.g., VM 1, VM n). Network bridge 306 may generate an aggregate network from multiple communication networks or network segments. Generation of an aggregate network may comprise combining separate networks in the data link layer (e.g., using a bridging table that forwards frames of data from the first network to the second network) such that the networks perform as a single, aggregate network.

Returning to FIG. 1B, the virtualization software 122 (e.g., Firecracker and/or any desired hypervisor/virtual machine manager) may be used to deploy guest virtual machines 128. In various examples, guest virtual machines 128 may be used to execute applications and/or services corresponding to particular smart devices configured to communicate with the edge computing system 100 executing on host computing device 101. For example, the smart devices may include a smart camera, a smart thermostat, and a smart lighting system and each of these smart devices may each be associated with their own guest virtual machine 128 on edge computing system 100 to perform various tasks related to the device. Accordingly, components of the edge computing system 100 may execute as virtual machines on virtualization software 122 (e.g., as Firecracker virtual machines). The user space of host kernel 118 may be minimal with the majority of operating system functionality being implemented by a control plane virtual machine 140.

For example, application 103 (FIG. 1A) may be executed within one or more guest virtual machines 128. Additionally, the perception graph 107 and perception graph builder 111 may be executed within a guest virtual machine 128. In various examples, the guest virtual machine 128 executing the perception graph 107 and perception graph builder 111 may not emulate and may not have access to a network adapter. Accordingly, the guest virtual machine 128 executing the perception graph 107 and perception graph builder 111 may not send or receive data via the internet and/or communicate with other computing devices separate from host computing device 101.

Control plane virtual machine 140 may be initiated at the end of the boot process of the host computing device by the command and control component ("CNC component") 124 (described in further detail below). The control plane virtual machine 140 may be configured with exclusive access to communication channels with the CNC component 124. The control plane virtual machine 140 may communicate with host kernel 118 and the underlying hardware using CNC component 124 to start and stop guest virtual machines, as described above.

The control plane virtual machine 140 may be separated into application services 150, core services 152, and low-level services 154. Application services 150 may be high-level services effective to respond to incoming messages from other devices on the LAN and/or to back-end systems over the internet. Application services 150 may be effective to direct network traffic to the correct guest virtual machine 128 (or other application) and may trigger launching of guest virtual machines 128 in response to received events and/or control signals.

Core services 152 may be background processes (e.g., daemons) comprising the components used to provide the high-level functionality of the application services 150. For example, the core services 152 may provide interfaces to components of the applications services 150 and/or the low-level services 154. The core services 152 comprise abstractions of the shared computing resources offered by the edge computing system 100 executing on host computing device 101 and maintain privilege boundaries between various guest virtual machines 128. Additionally, core services 152 may schedule and/or perform various maintenance processes such as OTA updates of the edge computing system 100, firmware updates and/or other software installs, etc. Low-level services 154 comprise hardware abstraction layers (HALs) and other foundational components of Linux server software stacks.

Generally, control plane virtual machine 140 may cause new guest virtual machines to be launched in response to control signals and/or events. For example, one of the application services 150 (e.g., ingress controller 156) running within control plane virtual machine 140 may receive an input/data that corresponds to some event. Based on the input/data, the appropriate application service may determine what type of processing needs to be performed on the input/data. Once that is determined, another appropriate application service may, in conjunction with one of the core services 152 (e.g., key service 174) determine authorization for staring a guest virtual machine to process the input/data. If it is determined that a guest virtual machine 128 is to be started in response to the event, the VM manager 168 uses APIs to send a sequences of messages to the CNC component 124. CNC component 124 may start and configure a new guest virtual machine 128. Notably, the CNC component 124 and virtualization software 122 may be the only user space processes executing outside of virtual machines. Accordingly, data for all user space processes may be isolated using virtualization technologies to provide enhanced security and minimize the potential attack surface of edge computing system 100. Accordingly, the edge computing system 100 architecture isolates guest code executing within guest virtual machines 128 from the functions of control plane virtual machine 140, as the guest code is executing on separate systems and interface with the control plane virtual machine 140 and the underlying host only through the command and control component 124 and virtualization software 122.

In addition to guest virtual machines 128 and the control plane virtual machine 140, the edge computing system 100 may comprise local implementations of database, storage, service discovery, and/or messaging (MQTT) primitives. In FIG. 1B, these primitives can be part of the engine virtual machines (VMs) 126. However, these primities do not need to be part of engine VMs 126 and could be separate entities running inside their individual VMs. Each of the primitives may be implemented in a virtual machine to prevent side channel attacks from unauthorized guest virtual machines 128. The primitives of the edge computing system 100 are services that applications running in guest virtual machines 128 can use to offload common operations/functionality in order to simplify the application code. In various examples, Amazon Technologies, Inc., of Seattle, Wash.'s Lambda service may be a primitive that may execute code (e.g., Java, Ruby, Python, etc.) to perform desired operations, in response to triggering events (e.g., a function call received over HTTP/HTTPS and/or a triggering event message (e.g., MQTT) received from a hardware sensor, etc.) without requiring the administration of compute resources and in a serverless environment. Storage related to the primitives is local to the host device (e.g., host computing device 101), enabling stronger privacy protection and lower latency relative to cloud-based alternatives. However, application developers (e.g., developers of applications running within guest virtual machines 128) may program their applications to use cloud-based storage and/or any remote back-end services, as desired.

Authentication service 162 authorizes and authenticates applications executing in guest virtual machines 128. For example, authentication service 162 may allow an application running in one or more guest virtual machines 128 to authenticate tokens received from a back-end web service associated with the application. Additionally, authentication service 162 may determine granular permissions describing which services of edge computing system 100 are accessible by a particular application. Permission data may be stored by permission service 172. For example, a particular application may include permissions allowing the application to access an engine virtual machine that deploys speech-processing models. Additionally, the permissions of permission service 172 may define which primitives are accessible by a particular application.

Notification controller 160 may send push notifications to users of the host computing device 101 upon which edge computing system 100 is running. For example, notification controller may send a push notification (e.g., email, SMS, application alert, etc.) to a user's mobile device to notify the user that storage 114 is nearly full and/or that an OTA update may cause service interruption during a particular time. In some other examples, the notification controller 160 may notify a user that an application install is in progress and that a user may be required to authorize permissions for the application. Notification controller 160 may communicate with VM Manager 168, installer service 170, and/or permission service 172. Additionally, notification controller 160 may send notifications to applications executing in guest virtual machines 128 and/or engine virtual machines 126 indicating that one or more services are currently down (e.g., during a software update).

Various computing functions may access a hardware resource (e.g., accelerator 108, GPU 112, an AI accelerator circuit, etc.). Engine virtual machines 126 may include virtual machines provisioned with access (in some cases exclusive access) to the specialized hardware. For example, the model server 115 may comprise machine learning models used to infer high-level events from video camera data (e.g., facial recognition, object identification and tracking, etc.). Accordingly, in various example implementations, the model server 115 may have access to an AI accelerator circuit, GPU 112, and/or video decoding hardware (e.g., accelerator 108). In another example, a speech-processing engine may comprise speech processing models (e.g., natural language processing, automatic speech recognition, etc.), and may have access to GPU 112, an AI accelerator circuit, and/or other tensor-processing hardware. In another example, a crypto-engine may perform encryption/decryption for the device and, as such, may access TPM and/or HSM 110 or other hardware-based root of trust within host computing device 101.

Figure 4:
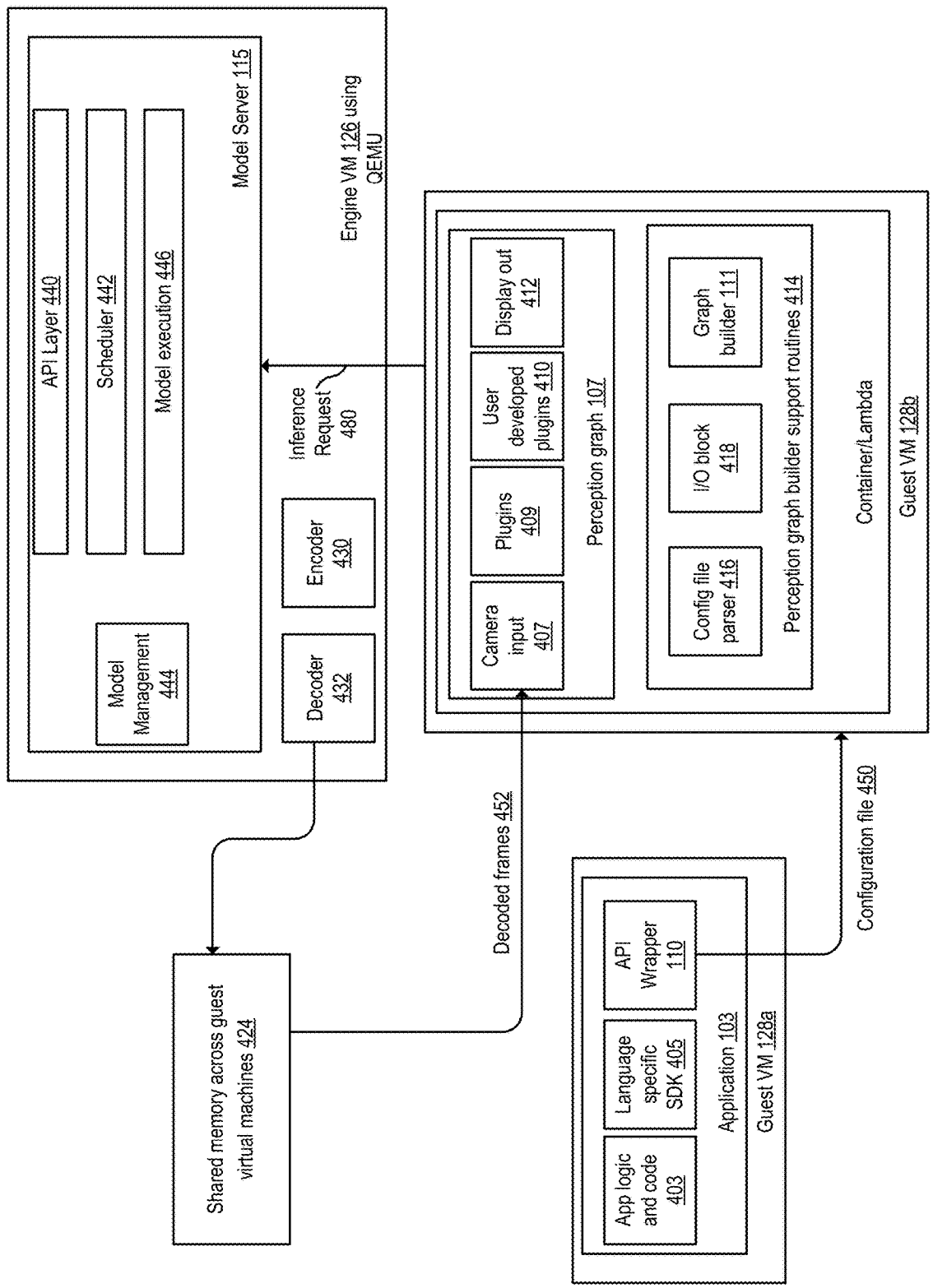
FIG. 4 depicts a block diagram illustrating an example of an application interacting with the deep learning architecture of the edge computing system, in accordance with various aspects of the present disclosure.

FIG. 4 depicts a block diagram illustrating an example of an application 103 interacting with the deep learning architecture of the edge computing system 100, in accordance with various aspects of the present disclosure. As previously described, a guest virtual machine 128a may be deployed and may execute an application 103. The application 103 may include application logic and code 403 effective to perform functionality associated with the application 103. Additionally, the application 103 may include a language-specific SDK 405 allowing the application to generate configuration files used by perception graph builder 111 to build perception graph 107. The language-specific SDK 405 may provide libraries that application logic and code 403 may use to request one or more operations to be performed by model server 115 (e.g., inference requests such as a request to execute one or more machine learning models to performs tasks requested by application 103). Application 103 may send the configuration file 450 generating using language-specific SDK 405 to the guest virtual machine 128*b*.

In various examples, the guest virtual machine 128*b* may be a specialized virtual machine that may not include an emulated network adapter or may include an emulated network adapter with limited functionality. For example, the guest virtual machine 128*b* may be configured without access to the internet and may not be able to communicate with computing devices outside of host computing device 101. In various examples, the guest virtual machine 128*b* may comprise a Lambda compute service configured to execute the perception graph builder support routines 414 to generate perception graph 107. In various examples, the perception graph builder support routines 414 may be used to generate perception graphs 107. The perception graphs 107 may include pipelines of different operations that may include operations requested by application 103. Such operations may include pre-processing operations requested by application 103 (e.g., checking image data frames to ensure that the frames are above a threshold average luminance value) and machine learning operations for execution by model server 115. Perception graphs 107 may be executed in specialized virtual machines that do not include internet access in order to prevent security breaches and/or unauthorized access of sensitive user data. In various examples, the guest virtual machine 128*b* may communicate with other components of the host computing device 101 using designated encrypted ports. Additionally, in various examples, only selected types of data may be sent through the designated ports. For example, an encrypted port through which the guest virtual machine 128*b* communicates with guest virtual machine 128*a* may be unable to transmit video or image data to prevent access by application 103 to decoded frames 452 and/or other video or image data.

The perception graph builder support routines 414 may include a configuration file parser 416 that may parse the configuration file provided by application 103. Additionally, the perception graph builder support routines 414 may include an input/output block 418 effective to retrieve data from sources within the edge computing system 100 that are used by the perception graph that is being generated (e.g., perception graph 107). Perception graph builder 111 may use the instructions parsed from the configuration file along with the relevant source data retrieved by I/O block 418 to generate perception graph 107.

The perception graph 107 may include a camera input 407 and/or other input used to receive source data (e.g., data to be processed in accordance with various executable instructions of the perception graph 107, as specified by configuration file 450). In the example of FIG. 4, the camera input 407 may receive decoded frames 52 from a shared memory across the guest virtual machines 424. Perception graph 107 may comprise both deep learning operating system plugins 409 (e.g., plugins that are provided by the model server 115) and/or user-developed plugins 410 specified by the application 103 (e.g., in configuration file 450). As previously described, the plugins may describe requested actions (e.g., video decode, CV operations, etc.) and/or identification of action-associated data to be processed by model server 115. Accordingly, the plugins of the perception graph 107 may comprise executable instructions that may be executed by model server 115 and/or by another component of edge computing system 100. Additionally, perception graph 107 may comprise a display out 412 block that may provide instructions for displaying, storing, and/or otherwise using result data returned by model server 115 after processing the perception graph 107. The perception graph 107 may comprise a workflow (e.g., a series of actions) requested by the application 103 using configuration file 450. Various actions of the workflow may be machine learning requests that may be carried out by model server 115, while other actions of the workflow may be performed locally by guest VM 128*b* and/or by another system.

If a particular action of a workflow of perception graph 107 invokes the model server 115, the requested action may be sent as part of an inference request 480 to model server 115. The inference request 480 may specify the machine learning model to be executed (e.g., the machine learning algorithm) as well as the image data and/or video data that should be input into the machine learning model. The machine learning model may be specified using plugins 409. The model server 115 may be executed within an engine virtual machine 126. The engine virtual machine 126 may use QEMU-based hardware emulation and may include a PCI-e pass-through to access specialized hardware of the host computing device 101 (e.g., the GPU 112 and/or an AI accelerator such as a circuit configured to perform tensor processing and/or matrix multiplication). In various examples, the QEMU-based engine virtual machine 126 may be the only virtual machine of edge computing system 100 with access to the underlying video processing hardware of host computing device 101, in order to limit access to special purpose hardware for security reasons.

In various examples, the QEMU-based engine virtual machine 126 may comprise one or more containers (e.g., Dockers) executing various components of the model server 115, decoder 432, encoder 430, and/or other components.

The model server 115 may include an API layer 440 through which the model server 115 may receive the inference request 480. The model server may use scheduler 442 to schedule execution of various models. As described in further detail below, the scheduler 442 may optimize the order and/or duration of model execution 446 in order to increase throughput and/or minimize usage of compute resources. Model server 115 may comprise a model management component 444 that may schedule and/or perform model updates and/or other maintenance operations. Model server 115 may execute various models specified in an inference request 480. Additionally, source data (e.g., decoded video data) included in and/or sent in conjunction with the inference request 480 may be used as input data to one or more of the machine learning models executed by the model server 115 in accordance with the inference request 480.

In various examples, the engine virtual machine 126 executing the model server may include an encoder 430 and/or a decoder 432. The encoder 430 may encode video data and/or result data generated by the model server 115. For example, video data (including bounding boxes, annotations, and/or other results from inference by model server 115) may be encoded and sent to a companion application associated with edge computing system 100 for viewing by a user. Decoder 432 may be used to decode raw video streams. In various examples, the decoded video may be stored in the shared memory across guest virtual machines 424 so that redundant decode operations need not be performed for multiple different applications requesting respective actions to be performed on the same video data. Guest virtual machine 128b may access the decoded frames 452 and may send decoded frames 452 to the model server 115 according to a perception graph 107. For example, if an action (e.g., a node) in a perception graph 107 specifies that a particular machine learning operation should be performed on a particular frame of decoded frames 452, guest virtual machine 128b may send the specified frame to model server 115 along with data indicating the requested machine learning operation to be performed on the frame as part of inference request 480. In the example, the guest virtual machine 128b may communicate with the engine virtual machine 126 using QEMU through a designated encrypted port that allows transmission of video data (and other inference request data, such as machine learning model execution requests).

Figure 5:
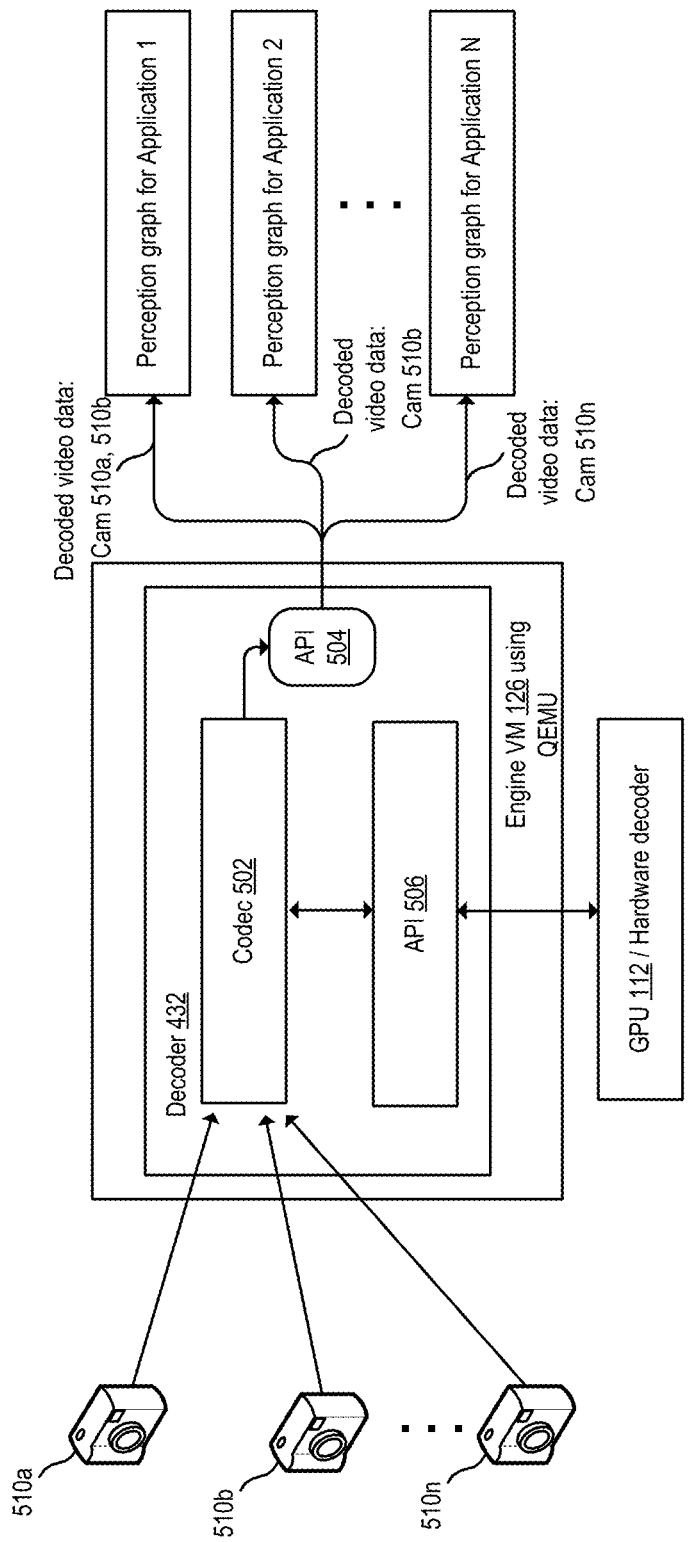
FIG. 5 depicts a block diagram of the decoder of FIG. 4, in accordance with various aspects of the present disclosure.

FIG. 5 depicts a block diagram of the decoder 432 of FIG. 4, in accordance with various aspects of the present disclosure. In various examples, various machine learning actions specified in perception graphs (such as perception graph 107 of FIG. 4) may be executed by the engine VM 126 using QEMU depicted in FIG. 4. In order to avoid redundant video decoding operations, decoder 432 may be effective to perform video decoding and send the relevant decoded video data to the perception graphs.

In various examples, configuration files sent from applications may specify the camera feeds used to perform a requested operation. For example, application 1 may generate a configuration file requesting camera feeds from camera 510a and 510b. Accordingly, the perception graph for application 1 may request the camera feeds from the engine VM 126 executing model server 115. In the example depicted in FIG. 5, the perception graph for application 2 may request the camera feed from camera 510b, and the perception graph for application N may request the camera feed from cam 510n.

Decoder 432 may receive the encoded video streams from each of the cameras 510a, 510b, 510n. A codec 502 may communicate with hardware of host computing device 101 through an API 506 (e.g., a low level API used to communicate with underlying system hardware) in order to decode the various video streams. In the example depicted in FIG. 5, the codec may use GPU 112 and/or a hardware decoder in conjunction with codec 502 (e.g., a software codec) to decode the various encoded video streams received from cameras 510a, 510b, . . . , 510n. Thereafter, the decoder 432 may send the appropriate decoded video streams to the requesting perception graphs and/or to the guest virtual machine 128b generating the perception graphs. As previously described, in the example depicted in FIG. 5, the perception graph for application 1 may have requested decoded video data from cameras 510a and 510b. The perception graph for application 2 has also requested decoded video data from camera 510b. Instead of decoding the video data from camera 510b twice (e.g., once for the perception graph for application 1 and once for the perception graph for application 2), the decoder 432 may decode the video data from camera 510b a single time and may send copies of the decoded video data to the appropriate perception graphs and/or to the guest virtual machine 128b generating the perception graphs.

In various examples, the perception graphs may comprise a multiplexer plugin enabling the model server 115 and/or the engine virtual machine 126 executing the model server 115 to make aggregation and/or batching decisions regarding which models should be executed for each of the incoming camera streams (e.g., from camera 510a, 510b, . . . , 510n), in what order should the models be executed, and which of the camera streams can be aggregated. In various examples, the determination as to which models should be executed may be based on the various size of the machine learning models (when loaded into memory) the frames-per-second requirements of the different input camera streams. In various examples, frames of different video streams can be aggregated together if the frames are to be input into the same model and/or model pipeline (e.g., a series of multiple models and/or rule-based systems executed in series, parallel, and/or some combination thereof). An example model pipeline may be for face recognition where a classifier model first detects human faces present within image data, crops the portions of the image data on the detected bounding boxes and/or segmentation masks, and sends the cropped portions to a different model to determine facial features of the cropped portions. Thereafter, the detected features may be sent to a classifier model used to identify the faces. It should be appreciated that the foregoing model pipeline is merely an example, and that any combination of models and/or rule-based systems may be used in accordance with the various techniques described herein. Although, the QEMU-based virtual machine executing model server 115 has access to the image data and/or other sensitive data used to perform the application-requested operations, the applications themselves are not permitted access to the image data and/or other sensitive data. Instead, result data (e.g., an identification of the identified person(s)) is sent to the application in the form of metadata.

In another example, a model pipeline and/or perception graph plugin may provide a series of models and/or rule-based approaches used to track one or more objects in image data. Similar to the face recognition example described above, in such an object tracking example, the applications may not receive access to the image data, but may instead receive result data, such as metadata indicating a location of the tracked object.

Figure 6:
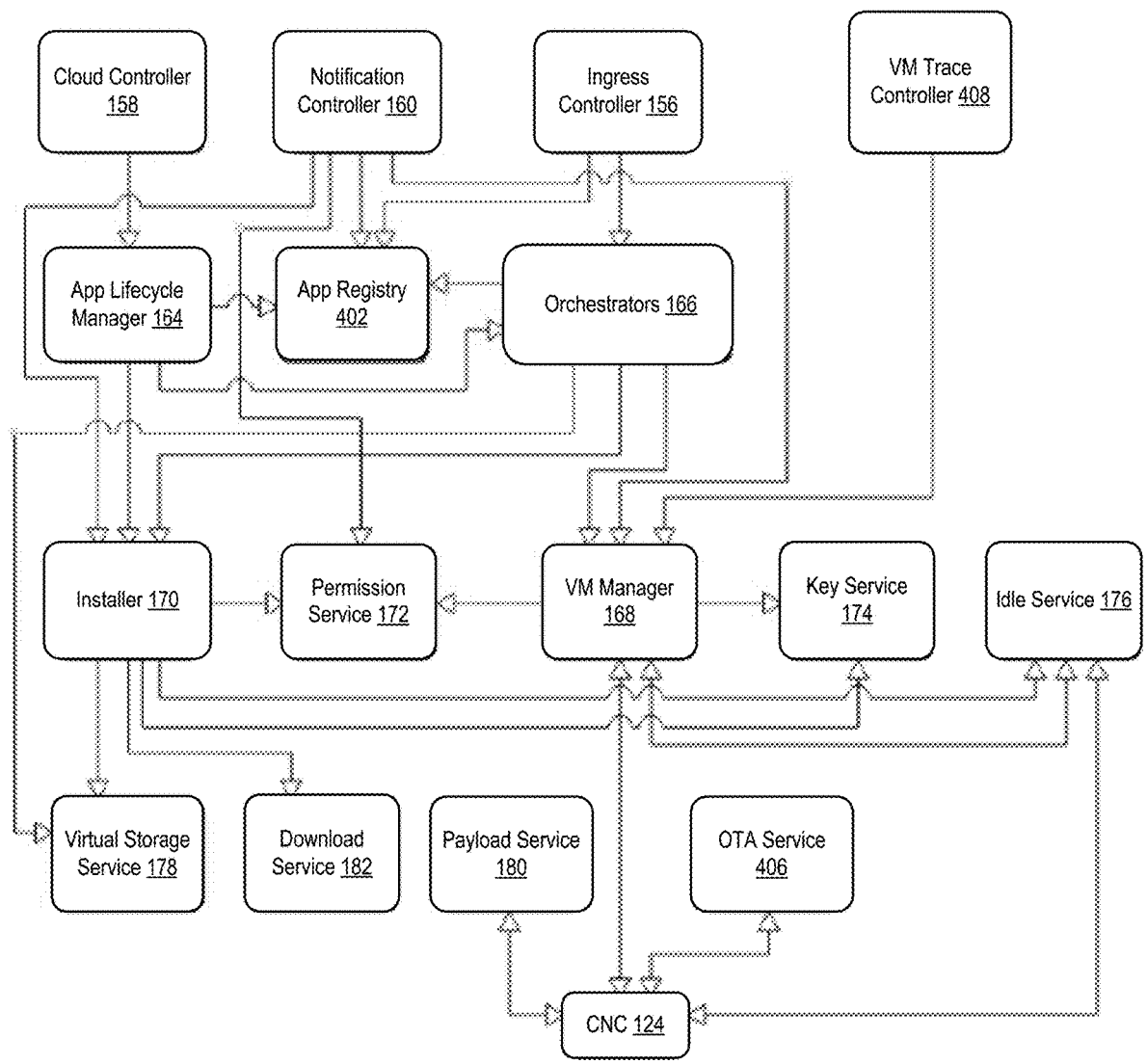
FIG. 6 depicts inter-process communication between various components of the edge computing system described herein, in accordance with various aspects of the present disclosure.

FIG. 6 depicts inter-process communication between various components of the edge computing system 100 described herein, in accordance with various aspects of the present disclosure. Cloud controller 158, notification controller 160, ingress controller 156, VM trace controller 408, application lifecycle manager 164, application registry 402, and/or orchestrator 166 may be part of application services 150 that communicate with software and/or devices outside host computing device 101 (e.g., devices on the LAN and remote devices accessible over the internet).

Installer service 170, permission service 172, VM manager 168, key service 174, idle service 176, virtual storage service 178, download service 182, and/or OTA service 406 may be part of core services 152. Core services 152 may not directly interface with components external to the host computing device 101 executing edge computing system 100. VM manager 168, installer service 170, key service 174, and/or permission service 172 may have elevated privileges associated with their respective functions. In various examples, processors may include different modes that allow the operating system to execute at different privilege levels. Tasks may be tagged with a corresponding privilege level. If a task attempts to access a resource or execute a privileged instruction, the processor(s) may determine whether the task has the appropriate privilege level. If not, a protection fault interrupt may be generated to prevent the task from performing the action. Access to VM manager 168, installer service 170, key service 174, and/or permission service 172 may be controlled by privileges delegated by the operating system. Accordingly, each of VM manager

168, installer service 170, key service 174, and/or permission service 172 may have a separate control interface so that each component is separately accessible, for security reasons. Accordingly, accessing one of VM manager 168, installer service 170, key service 174, and/or permission service 172 does not necessarily provide access to others of VM manager 168, installer service 170, key service 174, and/or permission service 172. Separate access privileges may be required for access to each of VM manager 168, installer service 170, key service 174, and/or permission service 172.

It should be appreciated that various components of edge computing system 100 may be omitted depending on the particular implementation. Furthermore, additional components apart from what is shown and described may be included in edge computing system 100, in accordance with the desired implementation.

Cloud controller 158 receives commands from remote computing device(s) associated with the edge computing system 100 (e.g., a back-end cloud service associated with the edge computing system 100). In various examples, the cloud controller 158 may receive application install commands, remove application commands, and/or application launch commands. Additionally, the cloud controller 158 may receive requests for state information concerning edge computing system 100 and send state information data in response. Further, cloud controller 158 may receive system reset commands and over the air (OTA) updates from the back-end systems associated with edge computing system 100.

In various examples system, the application install commands and/or application launch commands may be related to first party applications configured to operate/execute on the edge computing system 100. As depicted in FIG. 6, the cloud controller 158 may communicate with application lifecycle manager 164. For example, the cloud controller 158 may send application install packages to application lifecycle manager 164 for applications to be installed on edge computing system 100. As described in further detail below, the application lifecycle manager 164 may provision and/or designate resources of edge computing system 100 for a particular application during install. Additionally, application lifecycle manager 164 may manage the lifecycles (e.g., start, stop, reset) of guest virtual machines 128. In various examples, the cloud controller 158 may maintain a connection with a back-end cloud service associated with the edge computing system 100. The cloud controller receives control instructions from the back-end cloud service and performs actions in response to the instructions. As previously described, the instructions received by the cloud controller 158 may be instructions related to various specific operations (e.g., install application, remove application, and/or launch application). After processing the instructions, the cloud controller 158 may send a response to the back-end cloud service to confirm receipt of the instructions and/or to confirm that the appropriate action was performed. In various examples, the cloud controller 158 may queue received instructions in a buffer and may process the instructions stored in the buffer as processing resources are available. Queueing the instructions in a buffer may enable the cloud controller 158 to be fault tolerant in case the network connection is interrupted. For example, queued instructions may be executed when network connectivity is restored and/or while the edge computing system 100 is offline.

Ingress controller 156 may be a service that receives incoming service requests over the network. Examples of service requests may include HTTP, HTTPS, MQTT, etc. Ingress controller 156 may convert the incoming requests to instructions for VM Manager 168 to launch one or more virtual machines (e.g., guest virtual machines 128 and/or engine virtual machines 126) associated with the particular service request. Ingress controller 156 communicates over IPC with various orchestrators 166 and/or registries 402 (generally referred to herein as orchestrators 166). For example, ingress controller 156 may communicate over IPC with application registry 402, and various orchestrators 166 (e.g., a VM orchestrator, a container orchestrator, and/or a Lambda orchestrator). Application registry 402 may store data identifying applications and/or resources associated with applications using, for example, a uniform resource identifier (URI). Application registry 402 is described in further detail below.

Ingress controller 156 may receive HTTP and/or HTTPS requests when communicating with back-end services and/or web applications pertaining to guest virtual machines 128. Similarly, ingress controller 156 may receive MQTT signals from a device communicating on the LAN (e.g., sensor data detected by a smart device communicating on the LAN with the host computing device 101 executing the edge computing system 100). Edge computing system 100 may launch an appropriate application/service in response to receipt of such signals by the ingress controller 156, as described with reference to an example below.

For example, a smart thermostat may send an MQTT message to the edge computing system 100. The message may include data indicating a current temperature in the vicinity of the smart thermostat. Ingress controller 156 may receive the MQTT message and may route the temperature data to the appropriate guest virtual machine 128 (e.g., a guest virtual machine 128 executing a Lambda) for processing. In some embodiments, ingress controller 156 may receive the MQTT message and may send the data to application registry 402 to determine the appropriate application (e.g., by matching the uniform resource identifier (URI) associated with the appropriate application) and/or service associated with the MQTT message. After receiving data identifying the application from application registry 402, ingress controller 156 may send the data identifying the application and/or service to the appropriate orchestrator registry. For example, the MQTT message may include a URI. The URI may be associated in application registry 402 with a Lamda that processes temperature information. After determining the appropriate Lambda (and/or other resources) from application registry 402, the ingress controller 156 may send the MQTT message to the appropriate orchestrator 166 (e.g., a Lambda orchestrator). The Lambda orchestrator may, in turn, communicate with VM manager 168 to launch the guest virtual machine 128 that, in turn, executes the appropriate application code (e.g., a Lambda to process temperature data received with the MQTT message).

Advantageously, in the above example, the application developer for the smart thermostat need not manage the lifecycle of the guest virtual machine 128, the Lambda, and/or other aspects of the application code. Instead, edge computing system 100 may launch the appropriate service (e.g., a guest virtual machine 128 including a container, a Lambda, and/or other application code) in response to the incoming workload (e.g., the MQTT message). For example, the application developer does not need to supply an initialization service and/or watchdog service to manage the lifecycle of their application services. Instead, the edge computing system 100 controls the application (and the services thereof) execution. Guest virtual machines 128 may not be directly accessible via the LAN. As such, ingress controller 156 may route incoming service requests (e.g., MQTT data, HTTP data, etc.) to the appropriate guest virtual machine 128. For example, ingress controller 156 in conjunction with application registry 402 may map an application or service identifier to the appropriate application/service within the edge computing system 100. Additionally, the ingress controller 156 communicates with the appropriate orchestrator which communicates with VM manager 168 to execute the appropriate guest virtual machine 128 that includes the code used to execute the particular application service.

VM trace controller 408 may be an API used to extract performance data and debugging data from guest virtual machines 128. For example, a third party application developer may deploy an application on edge computing system 100 in one or more guest virtual machines 128. VM trace controller 408 may allow the third party developer to access trace data describing lifecycle events of their virtual machines and/or applications deployed thereon. Lifecycle events may refer to creation, optimization, management, and decommissioning of the virtual machines. Accordingly, VM trace controller 408 may allow developers to extract data concerning the performance of virtual machines deployed on edge computing system 100.

Payload service 180 may be a core service 152 (FIG. 1B) responsible for secure sharing of memory 104 between virtual machines (e.g., guest virtual machines 128 and/or engine virtual machines 126). Payload service 180 may be used to allocate memory when filesystem access is too slow for a particular process, when sharing via duplication creates synchronization problems, and/or when loading the data into memory for each application has a memory footprint that exceeds a threshold percentage of the total memory. For example, a frame of video—which may be too large to load into memory for multiple different applications that need to perform processes on the video frame—may be stored in a shared memory allocated by payload service 180. Payload service 180 may allocate the shared memory to multiple guest virtual machines 128 and/or engine virtual machines 126 that perform processes on the frame of the video according to permissions granted by permission service 172.

Without payload service 180, it might otherwise be necessary to execute processes that need to share memory (e.g., share a particular file or other data) within the same guest virtual machine 128. Such a scenario may lead to security concerns in the case where one virtual machine is compromised. The attacker may have access to shared between the infected virtual machine and one or more other virtual machines sharing data with the infected virtual machine. In some embodiments, running processes in separate guest virtual machines 128 may provide security and modularity benefits from a system-level perspective. Accordingly, with payload service 180, each process may run in its own virtual machine and may be provided with a shared memory space by payload service 180 and permission service 172.

VM manager 168 may configure, start, and stop guest virtual machines 128. Additionally, VM manager 168 may use scheduling algorithms to control access to hardware of host computing device 101 (e.g., one or more cores of processor(s) 102). Scheduling algorithms may use KVM 120 interfaces to control task scheduling on processor(s) 102.

Permission service 172 comprises information on permissions granted (and/or restrictions) for each application installed in the edge computing system 100 by the installer service 170. The permissions relate to accessing data sources under the control of the edge computing system 100 and whether an application and/or process of an application is triggered upon detection of a given event (e.g., receipt of an MQTT message, an HTTP request, etc.). In some embodiments, permissions may include identification of hardware resources accessible by an application and/or process of an application. In some embodiments, permission service 172 may not enforce the permissions defined by permission service 172. Instead, permission service 172 may authenticate whether or not an application (or a process thereof) has been granted a particular permission. KVM 120 (FIG. 1B) may enforce permissions/restrictions defined by permission service 172. Permissions defined by permission service 172 may be used as a gating permission to control access to various resources of edge computing system 100. For security and privacy reasons, permission service 172 may be separated into an isolated program that can be fully audited instead of storing permissions and/or application specific data as part of another system or separately by each guest virtual machine 128. Additionally, privileges to make changes to the permissions data may be restricted to the permission service 172. Permissions may be extensible in that applications may declare their own privileges and use the declared privileges to protect application resources. Permission service 172 may be a core service 152 instead of an application service 150 for purposes of privilege separation.

Returning to FIG. 1B, low-level services 154 may comprise services that abstract hardware resources of host computing device 101. Low-level services 154 may communicate with core services 152. No guest virtual machines 128 and/or engine virtual machines 126 may directly access low-level services 154.

Low-level services 154 may comprise device hardware authentication (DHA) 194. DHA 194 may implement interfaces required by device registration as an abstraction on top of hardware components for per-component unique identifiers and/or root secrets. The design of DHA 194 is dependent on the particular hardware selected for the hardware root of trust (e.g., TPM/HSM 110) and how that hardware root of trust is exposed to higher layers of the operating system.

IDME 196 may be high-integrity storage for parameters that control the boot sequence of edge computing system 100. IDME may be a non-transitory storage medium for data that uniquely identifies individual units of a device (e.g., serial and/or model numbers of hardware components). IDME 196 may also store calibration data for components that may be calibrated during manufacturing (e.g., sensors). Such calibration data may be programmed during manufacturing. IDME 196 may be used to select between slots for subsystems that support AB updating of the system and for enabling special boot modes (e.g., to support software development on edge computing system 100). init 190 may be a Linux component that manages the start, initialization, and/or stop of all components of control plane virtual machine 140. Various other low-level services 154 may be included in edge computing system 100. For example, syslogd, ntpd, cron, hardware abstraction layers (HALs), boot parameters, sshd, shells and scripting languages, etc.

In addition, in various further examples, low-level services 154 may comprise a DNS server and/or an mDNS server for internal service routing since virtual IP address assignment may be dynamic. In some further examples, low-level services 154 may comprise an MQTT broker that uses a publish/subscribe model to control delivery of control plane-internal events such as signals sent between various components of control plane virtual machine 140. In some further examples, low-level services 154 may comprise low-level debugging tools such as strace, gdb, oprofile, valgrind, etc.

Figure 7:
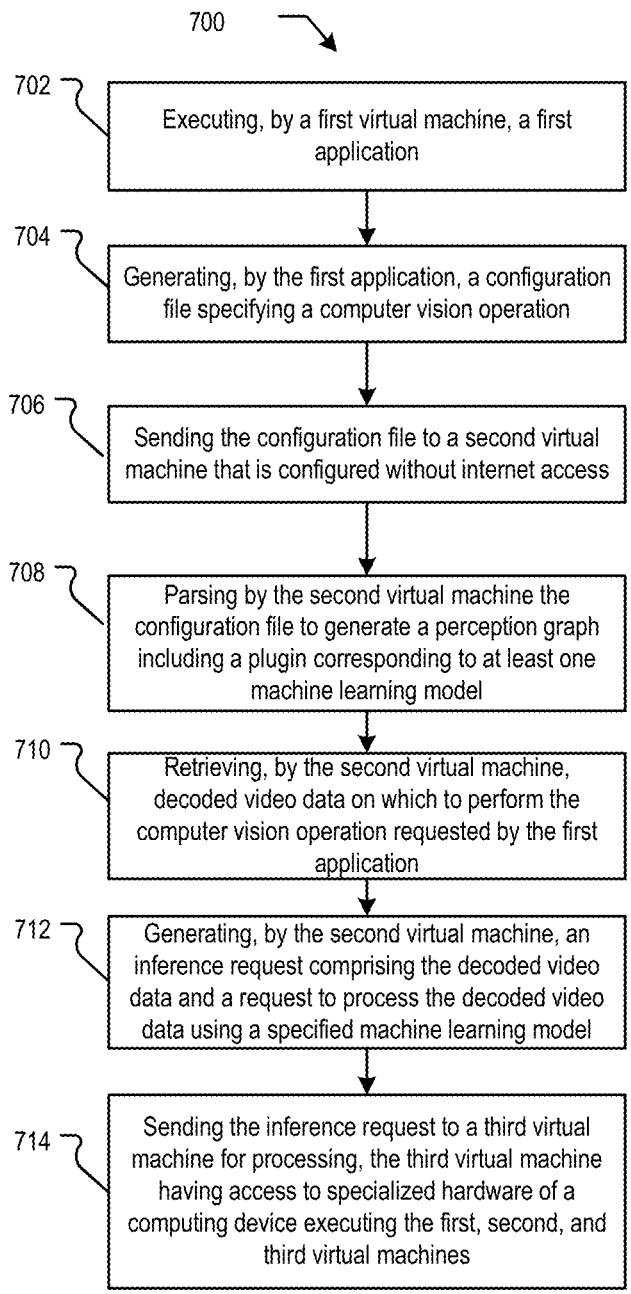
FIG. 7 depicts a flow chart showing an example process for initiating a computer vision operation by an application, in accordance with various aspects of the present disclosure.

FIG. 7 depicts a flow chart showing an example process 700 for initiating a computer vision operation by an application, in accordance with various aspects of the present disclosure. Process 700 may be performed, for e.g., by host computing device 101 of FIG. 1B. The portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 702, where a first virtual machine (e.g., a guest virtual machine 128) may execute a first application (e.g., application code representing all or a portion of an application). In the example, at action 704 the first application may generate a configuration file used to request a computer vision operation be performed by edge computing system 100. In various examples, the configuration file may specify a particular machine learning model and/or plurality of machine learning models used to perform the computer vision operation. In some further examples, the configuration file may specify source data that may be used as an input to the one or more machine learning models in order to perform the computer vision operation. For example, the configuration file may specify a particular camera feed on which the computer vision operation may be performed. For example, the configuration file may specify that a camera feed from camera #1 (e.g., a camera that is communicating with the host computing device 101) is to be processed using the one or more machine learning models. In various examples, the configuration file may specify time stamps and/or a range of time stamps that define the portions of the video feed that should be decoded and processed in accordance with the requested computer vision task.

Process 700 may continue from action 704 to action 706, where the configuration file may be sent to a second virtual machine that is configured without network access. For example, configuration file 450 may be sent to guest virtual machine 128b. As described above, in various examples, the guest virtual machine 128 to which the configuration file is sent may be a virtual machine that is configured without network access in order to keep sensitive data secure. The virtual machine may be configured to parse and generate a perception graph from the application-supplied configuration file. The virtual machine may execute the perception graph builder within a container and/or Lambda that is configured without network access. Additionally, the virtual machine may be configured in communication with a shared memory used to receive access to video data and/or other data to be operated in response to the configuration file.

At action 708, the second virtual machine may parse the configuration file and may generate a perception graph. As previously described, the perception graph may comprise one or more plugins effective to cause model server 115 to perform various actions (e.g., execute a specified machine learning model and/or a pipeline of specified machine learning models). The plugins may comprise executable instructions executable by the model server 115 and/or by an engine virtual machine 126 that is executing model server 115. In addition, the perception graph may comprise the source data and/or may identify the source data that the model server 115 is to process during performance of the requested computer vision operation.

At action 710, the second virtual machine may retrieve decoded video data (e.g., source data) on which to perform the computer vision operation requested by the first application. In various examples, instead of the second virtual machine retrieving the decoded video data, the perception graph generated by the second virtual machine may instead identify the decoded video data. The engine virtual machine 126 executing the model server 115 may decode the specified video data and may use the decoded video data to perform the requested computer vision operation.

At action 712, the second virtual machine may generate an inference request comprising a request to execute a machine learning model and/or the decoded video data to be input into the requested machine learning model. At action 714, the second virtual machine may send the inference request to a third virtual machine. In the example, the third virtual machine may represent a QEMU virtual machine (e.g., engine virtual machine 126 using QEMU of FIG. 4). The QEMU virtual machine may have access to specialized hardware of the host computing device 101 that may be used to perform and/or accelerate the requested computer vision operation. For example, the QEMU virtual machine may have access to a GPU, an artificial intelligence accelerator circuit, a tensor processing circuit, etc.

Figure 8:
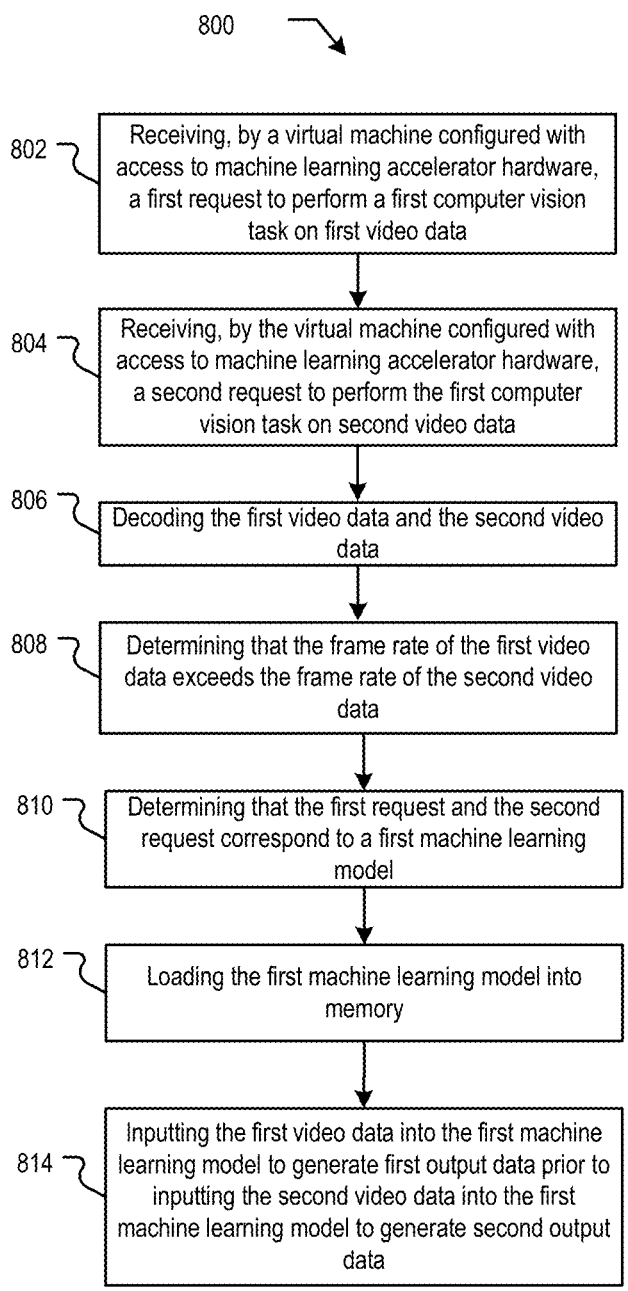
FIG. 8 depicts a flow chart showing an example process for performing a computer vision operation by a model server, in accordance with various aspects of the present disclosure.

FIG. 8 depicts a flow chart showing an example process 800 for performing a computer vision operation by a model server, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 may begin at action 802, at which a virtual machine configured with access to machine learning accelerator hardware (e.g., a GPU, tensor processor, and/or other artificial intelligence accelerator) may receive a first request to perform a first computer vision task on first video data. In various examples, the first request may be an inference request including one or more plugins (and/or other data) effective to cause one or more machine learning models to be executed. Further, the inference request may comprise source data and/or may identify source data that should be input to one or more of the machine learning models.

At action 804, the virtual machine configured with access to machine learning accelerator hardware may receive a second request to perform the first computer vision task on second video data. In various examples, the second request may be an inference request including one or more plugins (and/or other data) effective to cause one or more machine learning models to be executed. Further, the inference request may comprise source data and/or may identify source data that should be input to one or more of the machine learning models. In various examples, the first video data may be video data captured by a first camera device, while the second video data may be video data captured by a second camera device. In some further examples, the first video data and second video data may be captured by the same camera device, but may be captured at different times.

At action 806, the first video data and the second video data may be decoded. For example, the first video data and the second video data may be decoded by decoder 432 of FIG. 4. In at least some examples, the first and second decoded video data resulting from the decoding operations may be stored in a shared memory that may be accessible by one or more virtual machines privileged to access such data. For example, the guest virtual machine 128*b* that comprises the perception graph builder may be privileged to access the shared memory comprising the decoded video streams.

At action 808, a determination may be made that the frame rate of the first video data exceeds the frame rate of the second video data. Accordingly, in some examples, in order to avoid and/or minimize delay and/or degradation in video quality, the first video data may be processed before the second video data. At action 810, a determination may be made that the first request and the second request correspond to a first machine learning model. For example, the first request and the second request may correspond to the same computer vision task (and/or subtask) despite the first request and the second request potentially being issued by two different applications executing on the edge computing system 100.

At action 812, the first machine learning model may be executed and/or loaded into memory. For example, the first machine learning model and/or parameters thereof may be loaded from a data storage medium into memory 104 (FIG. 1B) for processing. At action 814, the first video data (e.g., as decoded by decoder 432) and/or a data representation thereof may be input into the first machine learning model. The first machine learning model may generate an output (e.g., one or more bounding boxes surrounding detected objects and/or persons, a segmentation mask, etc.). Thereafter, the second video data and/or a data representation thereof may be input into the first machine learning model. Advantageously, scheduler 442 may batch the first request and the second request together in a processing queue, based on the determination that the first request and the second request correspond to the same machine learning model. Without such scheduling, the first machine learning model may be loaded to service the first request, followed by a second machine learning model to service another request, followed by reloading the first machine learning model to service the second request. By grouping the first request and the second request together into a queue, compute resources may be conserved. Additionally, scheduling the first request prior to the second request based on the first video data having a higher frame rate may result in an improved user experience by avoiding playback interruption.

Figure 9:
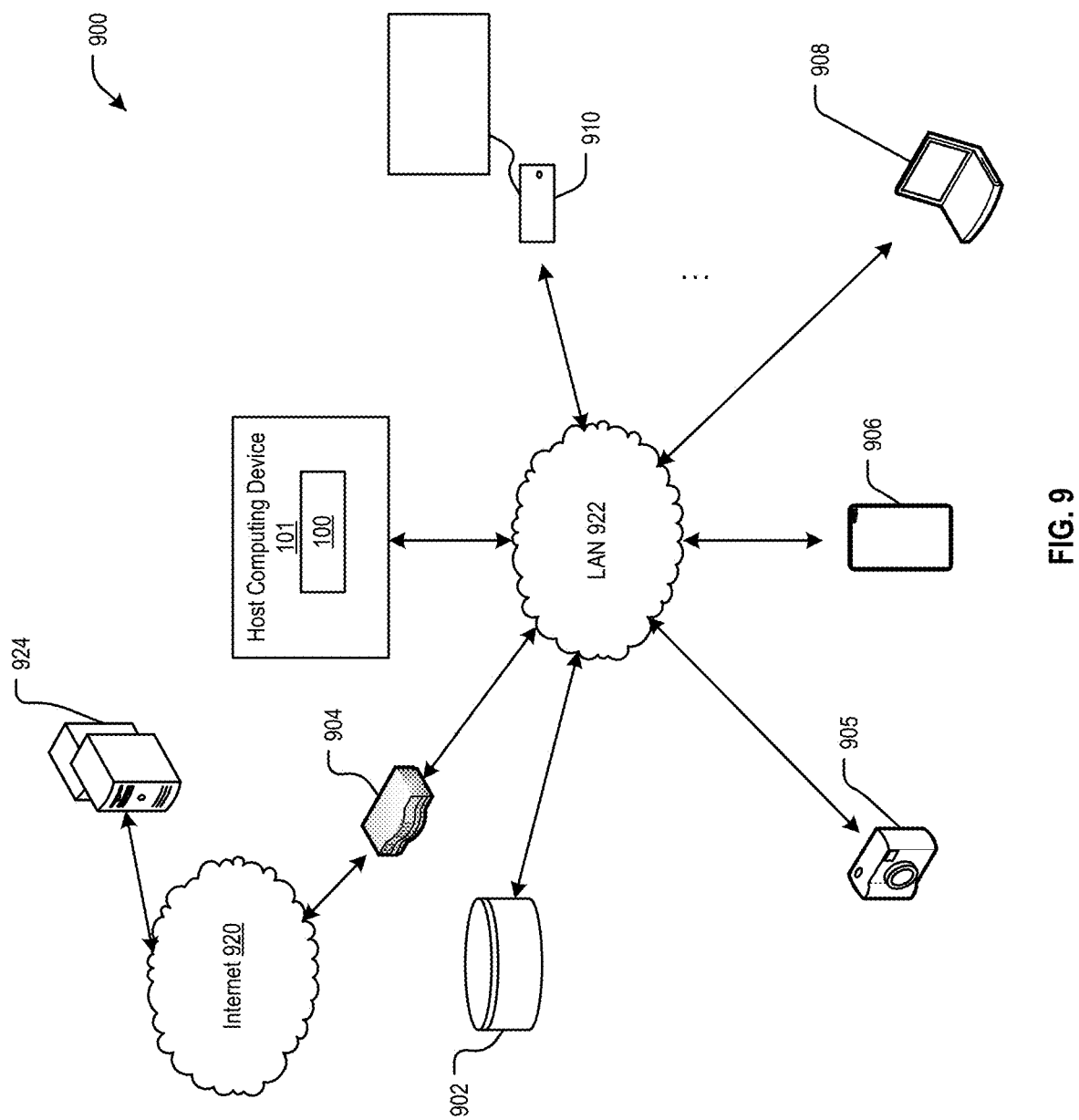
FIG. 9 is a diagram showing an example of an environment in which the edge computing system may be employed, in accordance with various aspects of the present disclosure.

FIG. 9 is a diagram showing an example of an environment 900 in which the edge computing system 100 may be employed, in accordance with various aspects of the present disclosure. The environment 900 includes several example computing devices that may communicate with edge computing system 100 executing on host computing device 101. The example computing devices 902, 904, 906, 908, 910 shown in FIG. 9 may be in communication with one another via the LAN 922. The various computing devices 902, 904, 906, 908, 910 may be smart devices that may have companion applications and/or processes that may be executed by guest virtual machines 128, engine virtual machines 126, and/or primitives deployed by edge computing system 100. In some embodiments, the host computing device 101 and computing devices 902, 904, 906, 908, 910 are deployed on a LAN 922 within a residential household.

The example computing devices 902, 904, 906, 908, 910 may communicate with one or more back-end computing devices 924 through an access point (e.g., example computing device 904, such as a router) configured to access internet 920. In various examples, back-end computing devices 924 may be associated with various ones of the computing devices 902, 904, 906, 908, 910 and/or with host computing device 101 executing edge computing system 100. For example, the back end services may perform compute operations associated with example computing devices 902, 904, 906, 908, 910 and/or associated with host computing device 101 executing edge computing system 100.

Although particular computing devices 902, 904, 906, 908, 910 are depicted in FIG. 9 and described below, different types of computing devices may be used without departing from the disclosure. For example, any computing devices configured to communicate with other computing devices over a network (e.g., Internet of Things devices) may be used in accordance with the protocols, systems, and methods described herein. In some examples, computing devices which may be used in accordance with the protocols, systems, and methods described herein may include automobiles, thermostats, appliances, lighting systems, heating/cooling devices, refrigerators, camera systems, voice assistant systems, mobile computing devices, speakers, robots, and/or other household goods with integrated networking technology.

An example computing device 910 may be a media player connected to a television or other suitable media device for playing back audio, video, or other media. The example computing device 910 may comprise a processor and associated data storage. The example computing device 910 may also comprise suitable input/output devices such as, switches or buttons for activating and/or configuring the example computing device 910, a display for providing a status of the example computing device 910, etc. The example computing device 910, in some examples, may store media data and/or may download media data from a remote computing device, such as back-end computing device 924. Media data stored and/or downloaded to the example computing device 910 may be displayed at a television or other suitable output device.

An example voice assistant-enabled computing device 902 may comprise one or more microphones (e.g., an array of microphones) and may be effective to receive voice commands/requests and send the voice commands/requests to host computing device 101 and/or a back-end computing device 924 for further processing and/or to generate a response and/or an action in response to the voice command/request.

An example digital camera computing device or digital camera 905 may be any suitable device configured to capture an image and/or video. The digital camera 905 may have one or more than one image sensor and may have a standard or panoramic field-of-view. In some examples, the digital camera 905 may be configured to communicate with other components of the environment 900 via the LAN 922. For example, the digital camera 905 may upload images and/or videos to the host computing device 101 executing edge computing system 100 or other component of the environment 900 for storage, processing, etc. In various examples, digital camera 905 may comprise one or more networked security cameras effective to monitor a physical environment (e.g., various rooms in a home) and may be effective to detect motion and send video to computing device 101, one or more back-end computing devices 924, mobile computing device 906, and/or some other device(s) for further processing, for storage, and/or for display.

An example mobile computing device 906 may be any suitable type of computing device comprising at least one processor and data storage. In some examples, the mobile computing device 906 may comprise one or more image sensors and associated optics for capturing an image or video. In some examples, the mobile computing device 906 may be configured to communicate on a cellular or other telephone network in addition or instead of the LAN 922. Also, in some examples, the mobile computing device 906 may be configured to access the internet 920 via the cellular or other telephone network. An example other computing device 908 may be any suitable type of computing device comprising a processor and data storage including, for example, a laptop computer, a desktop computer, etc. In some examples, the computing device 908 may comprise one or more image sensors and associated optics for capturing an image or video.

Various other Internet-of-things devices (e.g., smart devices) may be employed in environment 900 in accordance with the present disclosure. Advantageously, the various devices communicating with host computing device 101 executing edge computing system 100 may be developed by different manufacturers and different software developers and may deploy functionality in a secure and modular manner through edge computing system 100. Edge computing system 100 may provide security by running guest applications in separate virtual machines. Additionally, using the particular virtual machine instantiations described herein (e.g., Firecracker lightweight virtual machines, and/or container-based virtualized environments), edge computing system may launch virtual machines and perform guest application processing at near native speeds. Additionally, edge computing system may dynamically deploy guest virtual machines 128 in response to a trigger event and/or in response to a workload input without being required to continually execute every installed guest virtual machine. Furthermore, edge computing system 100 may include logic effective to oversubscribe to host hardware in order to optimally allocate resources and CPU scheduling.

Figure 10:
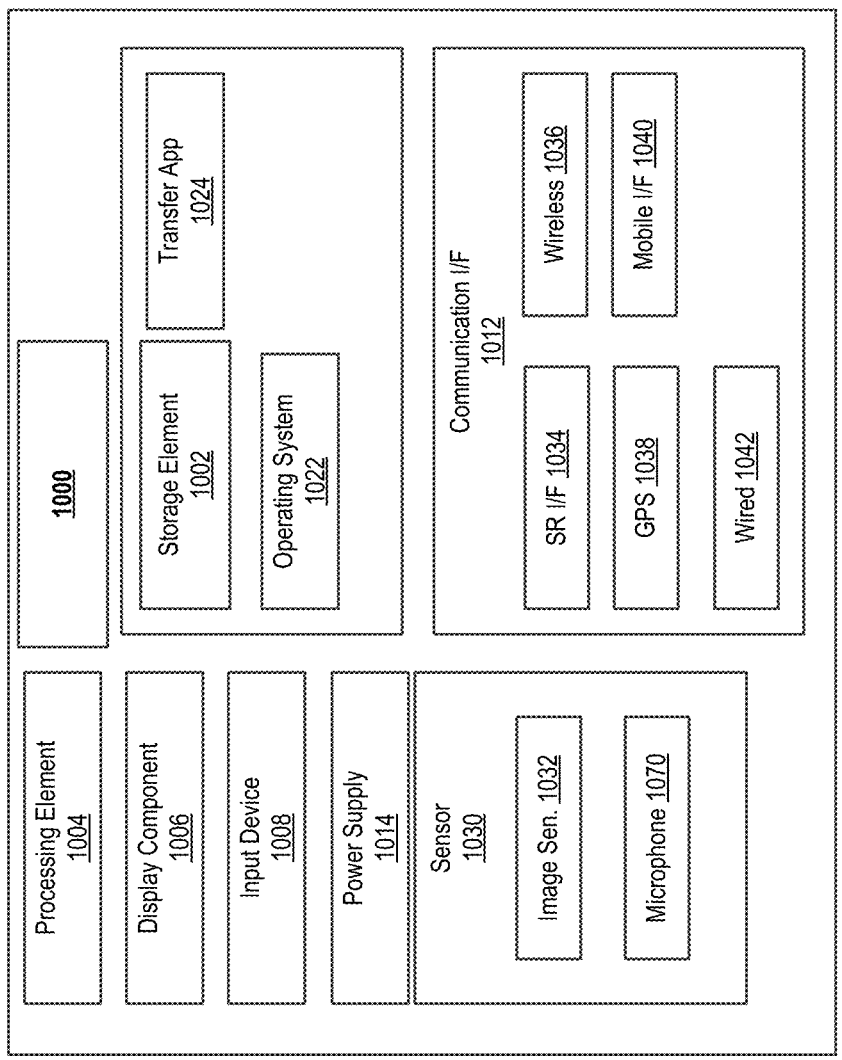
FIG. 10 is a block diagram of an example computing device architecture that may be used in accordance with various aspects of the present disclosure.

FIG. 10 is a block diagram showing an example architecture 1000 of a computing device that may be used, in accordance with various aspects of the present disclosure. For example, architecture 1000 may represent, at least in part, a computing architecture of a smart device configured in communication with host computing device 101 executing edge computing system 100. In some other examples, architecture 1000 may represent, at least in part, a computing architecture of host computing device 101 upon which edge computing system 100 is executed. It will be appreciated that not all devices will include all of the components of the architecture 1000 and some devices may include additional components not shown in the architecture 1000. The architecture 1000 may include one or more processing elements 1004 for executing instructions and retrieving data stored in a storage element 1002. The processing element 1004 may comprise at least one processor. Any suitable processor or processors may be used. For example, the processing element 1004 may comprise one or more digital signal processors (DSPs). The storage element 1002 can include one or more different types of memory, data storage, or computer-readable storage media devoted to different purposes within the architecture 1000. For example, the storage element 1002 may comprise flash memory, random-access memory, disk-based storage, etc. Different portions of the storage element 1002, for example, may be used for program instructions for execution by the processing element 1004, storage of images or other digital works, and/or a removable storage for transferring data to other devices, etc. Additionally, storage element 1002 may store segmentation masks generated using the object co-segmentation techniques described herein.

The storage element 1002 may also store software for execution by the processing element 1004. An operating system 1022 may provide the user with an interface for operating the computing device and may facilitate communications and commands between applications executing on the architecture 1000 and various hardware thereof. A transfer application 1024 may be configured to receive images, audio, and/or video from another device (e.g., a mobile device, image capture device, and/or display device) or from an image sensor 1032 and/or microphone 1070 included in the architecture 1000.

When implemented in some user devices, the architecture 1000 may also comprise a display component 1006. The display component 1006 may comprise one or more light-emitting diodes (LEDs) or other suitable display lamps. Also, in some examples, the display component 1006 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 1006 may be effective to display input images and/or segmentation masks generated in accordance with the various techniques described herein.

The architecture 1000 may also include one or more input devices 1008 operable to receive inputs from a user. The input devices 1008 can include, for example, a push button, touch pad, touch screen, wheel, joystick, keyboard, mouse, trackball, keypad, light gun, game controller, or any other such device or element whereby a user can provide inputs to the architecture 1000. These input devices 1008 may be incorporated into the architecture 1000 or operably coupled to the architecture 1000 via wired or wireless interface. In some examples, architecture 1000 may include a microphone 1070 or an array of microphones for capturing sounds, such as voice requests. In various examples, audio captured by microphone 1070 may be streamed to external computing devices via communication interface 1012.

When the display component 1006 includes a touch-sensitive display, the input devices 1008 can include a touch sensor that operates in conjunction with the display component 1006 to permit users to interact with the image displayed by the display component 1006 using touch inputs (e.g., with a finger or stylus). The architecture 1000 may also include a power supply 1014, such as a wired alternating current (AC) converter, a rechargeable battery operable to be recharged through conventional plug-in approaches, or through other approaches such as capacitive or inductive charging.

The communication interface 1012 may comprise one or more wired or wireless components operable to communicate with one or more other computing devices. For example, the communication interface 1012 may comprise a wireless communication module 1036 configured to communicate on a network according to any suitable wireless protocol, such as IEEE 802.11 or another suitable wireless local area network (WLAN) protocol. A short range interface 1034 may be configured to communicate using one or more short range wireless protocols such as, for example, near field communications (NFC), Bluetooth, Bluetooth LE, etc. A mobile interface 1040 may be configured to communicate utilizing a cellular or other mobile protocol. A Global Positioning System (GPS) interface 1038 may be in communication with one or more earth-orbiting satellites or other suitable position-determining systems to identify a position of the architecture 1000. A wired communication module 1042 may be configured to communicate according to the USB protocol or any other suitable protocol.

The architecture 1000 may also include one or more sensors 1030 such as, for example, one or more position sensors, image sensors, and/or motion sensors. An image sensor 1032 is shown in FIG. 10. Some examples of the architecture 1000 may include multiple image sensors 1032. For example, a panoramic camera system may comprise multiple image sensors 1032 resulting in multiple images and/or video frames that may be stitched and may be blended to form a seamless panoramic output. An example of an image sensor 1032 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 101, and/or the various other computing devices described herein, are exemplary, and may be located as a stand-alone device or may be included, in whole or in part, as a component of a larger device or system.

In the descriptions provided herein, each type or configuration of computing resource may be available in different sizes, such as large resources—consisting of many processors, large amounts of memory and/or large storage capacity—and small resources—consisting of fewer processors, smaller amounts of memory and/or smaller storage capacity.

The availability of virtualization technologies for computing hardware has afforded benefits for providing large scale computing resources for customers and allowing computing resources to be efficiently and securely shared between multiple customers. For example, virtualization technologies may enable a physical computing device to be shared among multiple users and/or guest applications by providing each user/guest application with one or more virtual machine (e.g., Firecracker virtual machines) and/or containers hosted by the physical computing device. A virtual machine may be a software emulation of a particular physical computing system that acts as a distinct logical computing system. Such a virtual machine provides isolation among multiple operating systems sharing a given physical computing resource. Furthermore, some virtualization technologies may provide virtual resources that span one or more physical resources, such as a single virtual machine with multiple virtual processors that span multiple distinct physical computing systems.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computing device comprising:
   at least one processor;
   a graphical processing unit; and
   at least one memory configured in communication with the at least one processor, the at least one memory storing instructions that, when executed by the at least one processor, are effective to program the at least one processor to:
   execute a first virtual machine, the first virtual machine effective to:
      execute a first application;
      generate, by the first application, a configuration file specifying a first computer vision operation; and
      send the configuration file to a second virtual machine, wherein the second virtual machine is configured to lack Internet access;
   wherein the second virtual machine is effective to:
      determine, from the configuration file, first data associated with the first computer vision operation;
      determine, from the configuration file, at least one frame of first video data on which to perform the first computer vision operation;
      generate decoded video data by decoding the at least one frame of first video data;
      store the decoded video data in the at least one memory;
      receive, from the at least one memory, the decoded video data;
      generate an inference request comprising a first request to perform the first computer vision operation on the decoded video data; and
      send the inference request to a third virtual machine, wherein the third virtual machine is configured with access to the graphical processing unit.

2. The computing device of claim 1, the at least one memory storing further instructions that, when executed by the at least one processor are further effective to program the at least one processor to:
   receive, by the third virtual machine, the inference request;
   execute, by the third virtual machine, a convolutional neural network (CNN) associated with the first computer vision operation;
   generate input data from the decoded video data;
   send the input data to the CNN; and
   generate output data by the CNN, wherein the output data is a result of the first computer vision operation.

3. The computing device of claim 2, the at least one memory storing further instructions that, when executed by the at least one processor are further effective to program the at least one processor to:
   send, by the third virtual machine, metadata representing the output data to the first application executed by the first virtual machine; and
   send, by the third virtual machine, the decoded video data and the metadata representing the output data to a companion application associated with the computing device.

4. A method comprising:
   generating, using a first application executed by a first virtual machine executing on a computing device, (i) a configuration file specifying a first machine learning task and (ii) first data;
   sending, by the first virtual machine, the configuration file to a second virtual machine executing on the computing device, wherein the second virtual machine is configured to lack Internet access;
   generating, using the second virtual machine, second data effective to cause the first machine learning task to be executed by a third virtual machine executing on the computing device using at least one of a graphical processing unit (GPU) or an accelerator circuit accessible by the third virtual machine;
   receiving, by the second virtual machine, the first data; and
   sending, by the second virtual machine, the first data and the second data to the third virtual machine.

5. The method of claim 4, further comprising:
   executing, by the third virtual machine, a first machine learning model effective to perform the first machine learning task;
   processing first input data representing the first data using the first machine learning model;
   generating, using the first machine learning model, first output data; and
   sending metadata representing the first output data to the first virtual machine.

6. The method of claim 4, further comprising:
   generating, using the third virtual machine, first output data from a first machine learning model, wherein the third virtual machine is configured to access the GPU of the computing device executing the third virtual machine; and
   sending the first output data to a mobile application associated with the computing device.

7. The method of claim 4, further comprising:
   receiving, by the third virtual machine, the first data and the second data, wherein the first data represents first video data captured by a camera device;
   receiving, by the third virtual machine, third data, wherein the third data specifies a second machine learning task requested by a second application;
   determining that the first machine learning task is executed prior to the second machine learning task; and
   executing, using the third virtual machine, a first machine learning model effective to perform the first machine learning task.

8. The method of claim 4, further comprising:
   decoding first video data to generate the first data, wherein the first data comprises decoded video data; and
   sending the first data to a shared memory accessible by the second virtual machine.

9. The method of claim 4, further comprising:
   executing, using the third virtual machine, a first machine learning model effective to perform the first machine learning task;
   processing first input data representing the first data using the first machine learning model, wherein the first data comprises decoded video data;
   generating, using the first machine learning model, first output data;
   sending metadata describing the first output data to the first virtual machine; and
   sending, by the third virtual machine, the first output data and the first data to a mobile application associated with the computing device executing the first virtual machine, the second virtual machine, and the third virtual machine.

10. The method of claim 4, wherein the second virtual machine lacks internet access, the method further comprising:
sending a request for video data to a memory accessible by the second virtual machine, wherein the receiving, by the second virtual machine, the first data comprises receiving the video data; and
sending, by the second virtual machine, the video data to the third virtual machine, wherein the third virtual machine is configured with hardware access to the computing device executing the first virtual machine, the second virtual machine, and the third virtual machine.

11. The method of claim 4, further comprising generating, by a second application executed using a fourth virtual machine, a second configuration file specifying a second machine learning task and a third machine learning task, wherein the configuration file indicates that the second machine learning task is to be performed prior to the third machine learning task.

12. The method of claim 4, further comprising:
sending, by the first application, the configuration file to the second virtual machine using a first application programming interface of the first application; and
executing, using the third virtual machine, a first machine learning model effective to perform the first machine learning task by accessing the GPU or the accelerator circuit of the computing device executing the first virtual machine, the second virtual machine, and the third virtual machine.

13. A computing device, comprising:
at least one processor; and
at least one memory configured in communication with the at least one processor, the at least one memory storing instructions that, when executed by the at least one processor, are effective to program the at least one processor to:
generate, using a first application executed by a first virtual machine, a configuration file specifying a first machine learning task and first data;
send, by the first virtual machine, the configuration file to a second virtual machine, wherein the second virtual machine is configured to lack Internet access;
generate, using the second virtual machine, second data effective to cause the first machine learning task to be executed by a third virtual machine using at least one of a graphical processing unit (GPU) or an accelerator circuit accessible by the third virtual machine;
receive, by the second virtual machine, the first data; and
send, by the second virtual machine, the first data and the second data to the third virtual machine.

14. The computing device of claim 13, the at least one memory storing further instructions that, when executed by the at least one processor are further effective to program the at least one processor to:
execute, by the third virtual machine, a first machine learning model effective to perform the first machine learning task;
process first input data representing the first data using the first machine learning model;
generate, using the first machine learning model, first output data; and
send metadata representing the first output data to the first virtual machine.

15. The computing device of claim 13, the at least one memory storing further instructions that, when executed by the at least one processor are further effective to program the at least one processor to:
generate, using the third virtual machine, first output data from a first machine learning model, wherein the third virtual machine is configured to access the GPU of the computing device; and
send the first output data to a mobile application associated with the computing device.

16. The computing device of claim 13, the at least one memory storing further instructions that, when executed by the at least one processor are further effective to program the at least one processor to:
receive, by the third virtual machine, the first data and the second data, wherein the first data represents first video data captured by a camera device communicating with the computing device;
receive, by the third virtual machine, third data, wherein the third data specifies a second machine learning task requested by a second application;
determine that the first machine learning task is executed prior to the second machine learning task; and
execute, by the third virtual machine, a first machine learning model effective to perform the first machine learning task.

17. The computing device of claim 13, wherein the at least one memory storing further instructions that, when executed by the at least one processor are further effective to program the at least one processor to:
decode first video data to generate the first data, wherein the first data comprises decoded video data; and
send the first data to a shared memory accessible by the second virtual machine.

18. The computing device of claim 13, the at least one memory storing further instructions that, when executed by the at least one processor are further effective to program the at least one processor to:
execute, using the third virtual machine, a first machine learning model effective to perform the first machine learning task;
process first input data representing the first data using the first machine learning model, wherein the first data comprises decoded video data;
generate, using the first machine learning model, first output data;
send metadata describing the first output data to the first virtual machine; and
send, by the third virtual machine, the first output data and the first data to a mobile application associated with the computing device.

19. The computing device of claim 13, wherein the second virtual machine lacks internet access, and wherein the at least one memory storing further instructions that, when executed by the at least one processor are further effective to program the at least one processor to:
send a request for video data to a memory accessible by the second virtual machine, wherein the receipt, by the second virtual machine, of the first data comprises receipt of the video data; and
send, by the second virtual machine, the video data to the third virtual machine, wherein the third virtual machine is configured with hardware access to the computing device.

20. The computing device of claim 13, the at least one memory storing further instructions that, when executed by the at least one processor are further effective to program the at least one processor to generate, by a second application executed using a fourth virtual machine, a second configuration file specifying a second machine learning task and a third machine learning task, wherein the configuration file indicates that the second machine learning task is to be performed prior to the third machine learning task.

* * * * *